(12) United States Patent
Pulitzer et al.

(10) Patent No.: US 10,796,492 B2
(45) Date of Patent: Oct. 6, 2020

(54) SYSTEM AND METHOD FOR HAPTIC MAPPING OF A CONFIGURABLE VIRTUAL REALITY ENVIRONMENT

(71) Applicant: Exploring, Inc., Atlanta, GA (US)

(72) Inventors: Jovan Hutton Pulitzer, Frisco, TX (US); David Walens, Marietta, GA (US); Matthew Kelly, Acworth, GA (US); Geoffrey Wright, Marietta, GA (US)

(73) Assignee: EXPLORING, INC., Atlanta, GA (US)

( * ) Notice: Subject to any disclaimer, the term of this patent is extended or adjusted under 35 U.S.C. 154(b) by 0 days.

(21) Appl. No.: 16/355,218

(22) Filed: Mar. 15, 2019

(65) Prior Publication Data

US 2019/0371069 A1 Dec. 5, 2019

Related U.S. Application Data

(63) Continuation of application No. 15/991,686, filed on May 29, 2018, now Pat. No. 10,255,729.

(51) Int. Cl.
*G06T 19/00* (2011.01)
*G06F 3/01* (2006.01)
(Continued)

(52) U.S. Cl.
CPC ............. *G06T 19/006* (2013.01); *E04B 1/19* (2013.01); *E04B 2/7425* (2013.01); *E04B 5/02* (2013.01);
(Continued)

(58) Field of Classification Search
CPC ................ G06T 19/006; G06T 19/003; E04F 15/02044; E04F 15/046;
(Continued)

(56) References Cited

U.S. PATENT DOCUMENTS 5,848,501 A * 12/1998 Taipale ................. E04F 11/002
52/126.4
6,792,319 B1 * 9/2004 Bilger .................... G05B 15/02
700/13
(Continued)

*Primary Examiner* — William A Beutel
(74) *Attorney, Agent, or Firm* — Gregory M. Howison

(57) ABSTRACT

A system for providing a configurable virtual reality environment model includes a plurality of wall panels that are removeably interconnectable with each other without a need for tools. A plurality of floor sections are removeably interconnectable without a need for tools and include a connection interface for removeably connecting the wall panels to the plurality of floor sections. The plurality of wall panels are configured to place physical walls in a location that corresponds to a virtual wall located within a virtual reality world such that when a virtual reality display shows the user touching a wall in the virtual reality world, the user feels the physical wall placed in the configurable virtual reality environment. At least one network accessible component associated with a portion of the plurality of wall panels provides tactile feedback to a user responsive to the user coming within a predetermined distance of a wall panel. A network controller connected to the at least one network accessible component through a network actuates operation of the at least one network accessible component responsive to the user coming within the predetermined distance of the wall panel.

12 Claims, 19 Drawing Sheets

(51) Int. Cl.
*E04B 1/19* (2006.01)
*E04B 5/10* (2006.01)
*E04B 5/02* (2006.01)
*E04F 15/02* (2006.01)
*E04B 2/74* (2006.01)

(52) U.S. Cl.
CPC .......... *E04B 5/10* (2013.01); *E04F 15/02044* (2013.01); *G06F 3/011* (2013.01); *G06F 3/012* (2013.01); *G06F 3/016* (2013.01); *G06T 19/003* (2013.01); *E04B 2001/1936* (2013.01); *E04B 2001/1966* (2013.01); *E04B 2002/7483* (2013.01); *E04B 2002/7487* (2013.01); *E04F 2015/02066* (2013.01)

(58) Field of Classification Search
CPC ............ E04F 2015/02066; G06F 3/011; G06F 3/016; G06F 3/012; E04B 2002/7483; E04B 2002/7487; E04B 2001/1966; E04B 2001/1936; E04B 5/10; E04B 5/02; E04B 2/7425; E04B 1/19; E04H 1/1272; G02B 2027/0187; G02B 2027/014; G02B 27/017; G02B 27/0176
See application file for complete search history.

(56) References Cited

U.S. PATENT DOCUMENTS

2011/0111871 A1* 5/2011 Legary ................. A63G 31/007
                                                              472/128
2018/0144525 A1* 5/2018 Gutierrez .............. G06T 19/003

* cited by examiner

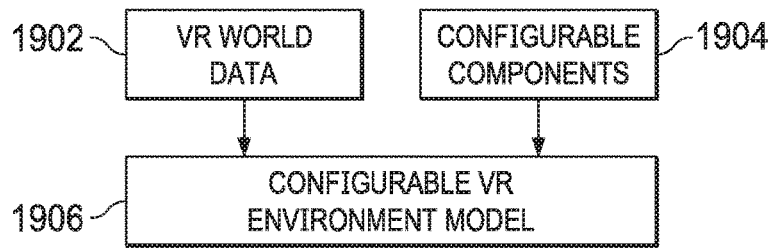
FIG. 19
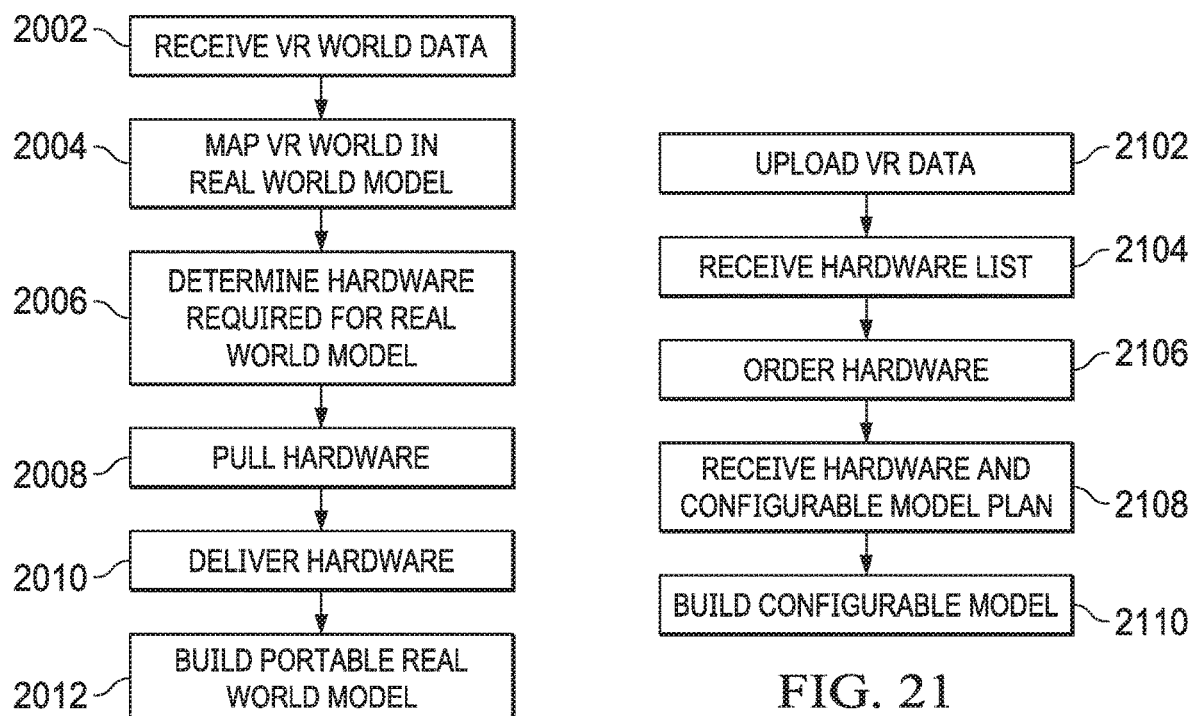
FIG. 20
FIG. 21

SYSTEM AND METHOD FOR HAPTIC MAPPING OF A CONFIGURABLE VIRTUAL REALITY ENVIRONMENT

CROSS-REFERENCE TO RELATED APPLICATIONS

This application is a continuation of U.S. patent application Ser. No. 15/991,686, filed May 29, 2018, entitled SYSTEM AND METHOD FOR HAPTIC MAPPING OF A CONFIGURABLE VIRTUAL REALITY ENVIRONMENT, which is incorporated by reference in its entirety.

TECHNICAL FIELD

The present invention relates to virtual reality environments, and more particularly, to a method for providing a configurable virtual reality environment model that a user may interact with in conjunction with a virtual reality environment.

BACKGROUND

Virtual reality systems have been greatly increasing in popularity and usage as the ability to create virtual worlds using computer technologies have developed. Within a virtual reality system, a user wears some type of headset or viewing goggles which project a virtual world for the user to see. Virtual reality systems may find uses in various types of training for soldiers, police officers, firemen, etc. or within an entertainment environment such as a gaming or movie viewing system. Current virtual reality systems normally place the user in a location where the user may freely move about without physically touching anything in the real world other than the floor. Thus, if the user touches a wall or item in the virtual reality world they can see this interaction through their virtual reality (VR) headset but the user does not physically feel anything in the real world.

One manner in which the virtual-reality experience has been improved for users is the use of various types of haptic feedback. Items in a user's hand or mounted to their body may vibrate or shake in order to provide physical feedback similar to what is occurring within the virtual-reality world. Another technique has been the creation of a fixed set within the real world that in its physical configuration mimics the items that are being viewed in the virtual-reality world. Thus, for example, if the user was reaching out to touch a wall in the virtual-reality world, the user would feel a physical wall in the real world that would provide a further input such that the user did not only see themselves touching a wall but actually felt themselves doing so. The problem with creating these type of fixed per minute real world sites are that the system is limited to a single map for operating with the virtual-reality world and the requirements that the physical model be created at a fixed location that requires users to come from other locations in order to experience the VR world in this manner.

SUMMARY

The present invention, as disclosed and described herein, in one aspect thereof comprise a system for providing a configurable virtual reality environment model includes a plurality of wall panels that are removeably interconnectable with each other without a need for tools. A plurality of floor sections are removeably interconnectable without a need for tools and include a connection interface for removeably connecting the wall panels to the plurality of floor sections. The plurality of wall panels are configured to place physical walls in a location that corresponds to a virtual wall located within a virtual reality world such that when a virtual reality display shows the user touching a wall in the virtual reality world, the user feels the physical wall placed in the configurable virtual reality environment. At least one network accessible component associated with a portion of the plurality of wall panels provides tactile feedback to a user responsive to the user coming within a predetermined distance of a wall panel. A network controller connected to the at least one network accessible component through a network actuates operation of the at least one network accessible component responsive to the user coming within the predetermined distance of the wall panel.

BRIEF DESCRIPTION OF THE DRAWINGS

For a more complete understanding, reference is now made to the following description taken in conjunction with the accompanying Drawings in which:

FIG. 19 illustrates the manner in which a configurable VR environment model may be generated;

FIG. 20 illustrates a flow diagram describing the manner for creation of the configurable VR environment model;

FIG. 21 illustrates a flow diagram describing the manner in which a customer would order a configurable VR environment model;

DETAILED DESCRIPTION

Figure 1:
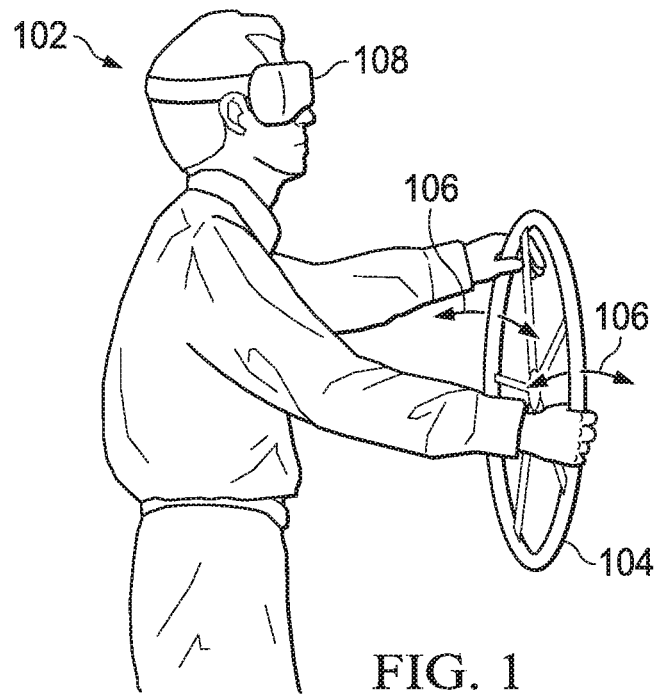
FIG. 1 illustrates a user interacting with a haptic feedback steering wheel.

Referring now to the drawings, wherein like reference numbers are used herein to designate like elements throughout, the various views and embodiments of a system and method for haptic mapping of a configurable virtual reality environment are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a first manner in which virtual-reality worlds have interacted with the real world using haptic feedback. Within a haptic feedback system, a user 102 receives physical feedback from a device that they are in contact with during the virtual-reality experience. In FIG. 1, the user 102 is holding a steering wheel 104. In order to simulate driving an actual vehicle and receive feedback through the steering wheel 104 that simulates driving a vehicle, the steering wheel 104 will shake as shown generally at 106. The shaking movement simulates the feel that a user would receive through a steering wheel 104 of an actual vehicle. The shaking 106 of the steering will 104 would be synchronized with events occurring through the virtual-reality (VR) headset 108 such that when a user 102 saw something through the headset 108, they would also feel something related to what they saw through the steering wheel 104.

Figure 2:
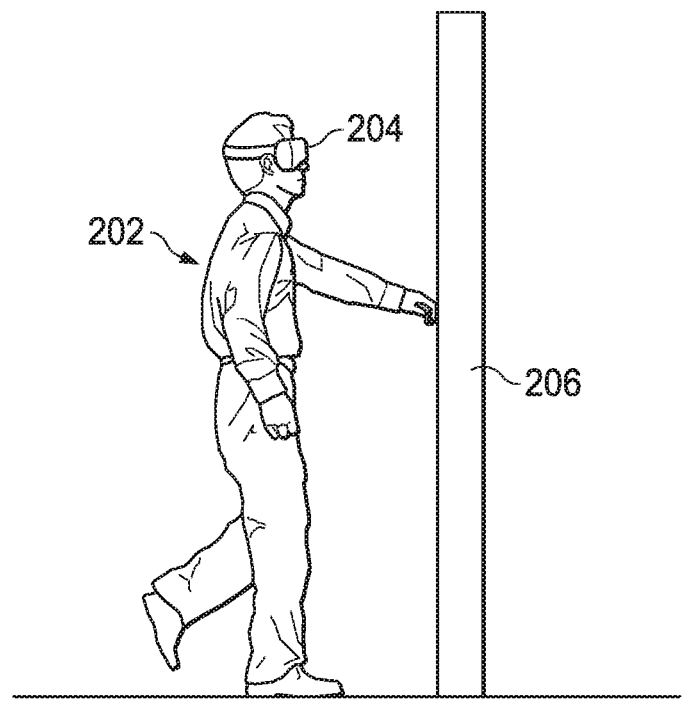
FIG. 2 illustrates a user in a VR headset physically interacting with a wall.

FIG. 2 illustrates a further manner in which a user 202 interacts with a virtual-reality environment through a headset 204. Normally, within a virtual-reality system, the user 202 sees the virtual-reality world through the headset 204. Within the actual physical world, the user 202 is placed within an open room or area so that the user will not physically touch items in the real world that would conflict with the images being presented to the user in the virtual-reality world through the headset 204. Thus, while the user 202 may see particular events through the headset 204 they do not "feel" the events they are seeing. In order to overcome this shortcoming, virtual-reality systems have been paired with a physical environment in a manner referred to as haptic mapping. Within this environment, physical elements 206 such as walls, windows, tables, doors, etc. are located within a physical area and these physical items are located at a same position as they are presented within the virtual-reality world that the user 202 is viewing through the headset 204. Thus, when the user 202 reaches out with their hand and places their hand on a wall within the virtual-reality world, the user would also feel the actual wall 206 that has been placed within the physical space surrounding the user. Thus, the user 208 would experience a more immersive experience as they would both see and feel the virtual-reality experience. These physical models generated by existing virtual-reality systems are permanently created in fixed locations that require the virtual-reality systems users to experience only a single virtual-reality model because only a single physical environment is available with which the user can interact. Overhead cameras in the physical space allow mapping of the virtual headsets to the physical world.

Figure 3:
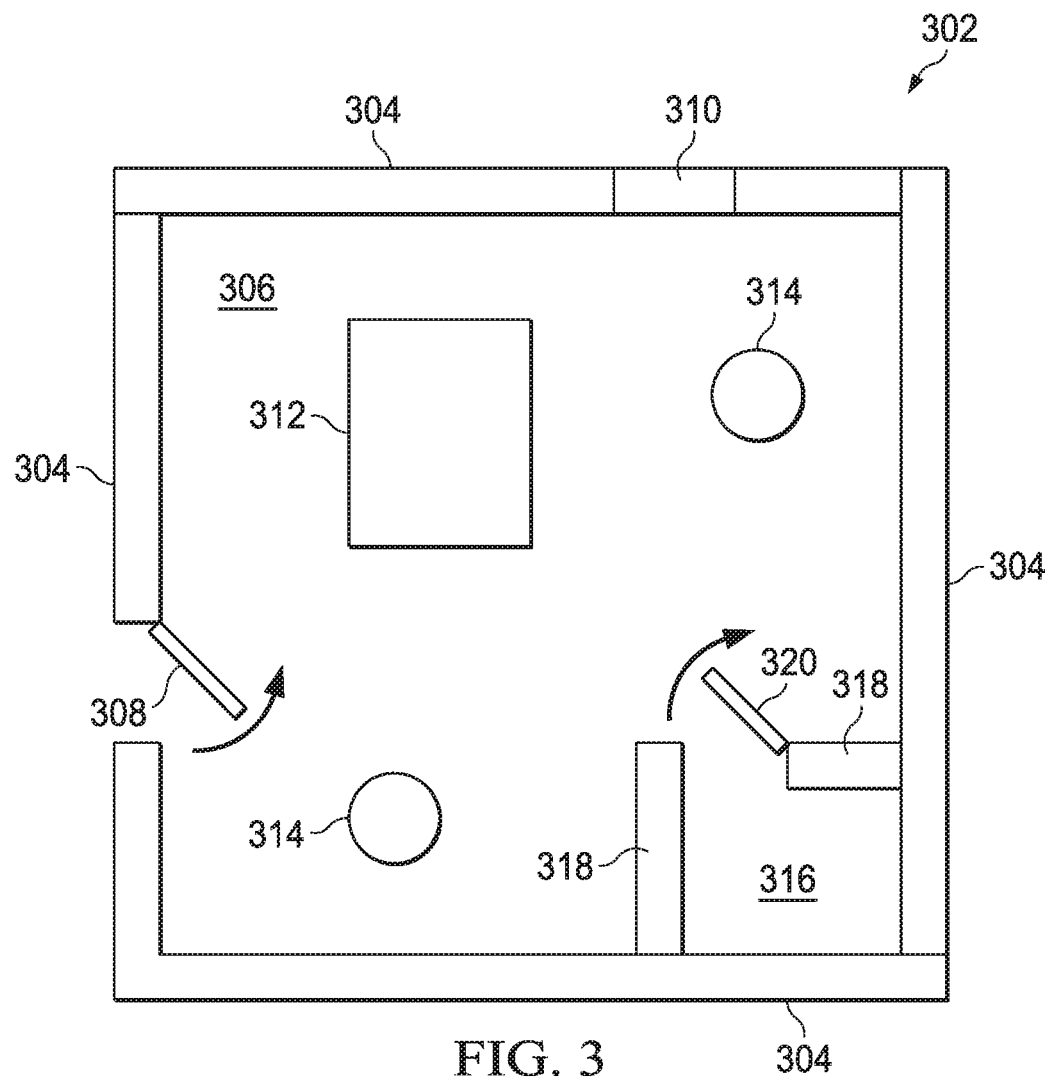
FIG. 3 illustrates a map of a physical room that may be created for a user in a VR world to interact with while interacting in the VR world.

A more detailed illustration of a configurable VR environment model 302 is illustrated in FIG. 3. A top down view of a configurable VR environment model 302 of a room is illustrated. The room includes four walls 304 enclosing an interior area 306. One wall 304 defines a door 308 enabling entry into and exit from the interior area 306 of the room. Another wall 304 defines a window 310 which would enable the user 314 to feel a window which they were looking out of in the virtual-reality environment. The room configuration also includes a table or counter 312 within the interior area 306 that may be physically interacted with by virtual-reality users 314 that are moving about the room. Finally, a closet 316 is defined in one corner of the room via another set of walls 318. The closet 316 may be accessed via a second door 320.

Within this configurable VR environment model 302, the users 314 may move about the interior area 306 of the room. The physical structure enables the users 314 to actually touch walls 304 that they see within the VR world, pass through doors 308, 320 seen within the VR world, feel windows 310 that they are looking out of within the VR world and interact with structures such as tables or counters 312 located within the interior of the room. This provides the user 314 with a much more immersive VR experience as they are able to both see the VR world through their VR headset and feel a related item within the physical world.

In order to provide variety to the users 314, the ability to provide a configurable VR environment model 302 is necessary. Otherwise, the users 314 would be required to always play a same physical model that could never be changed. This would limit the entertainment factor in a gaming type environment as the user 314 would become bored with the environment after a certain number of game plays. Within a virtual-reality training environment, it is often necessary to configure an environment to a particular situation for which a group of individuals is training. If the group is only allowed train up on a single fixed physical environment, the benefits of the training are greatly limited. Thus, the ability to provide a varied environment and varied training scenarios will provide much greater training benefits to all individuals involved.

Figure 4A:
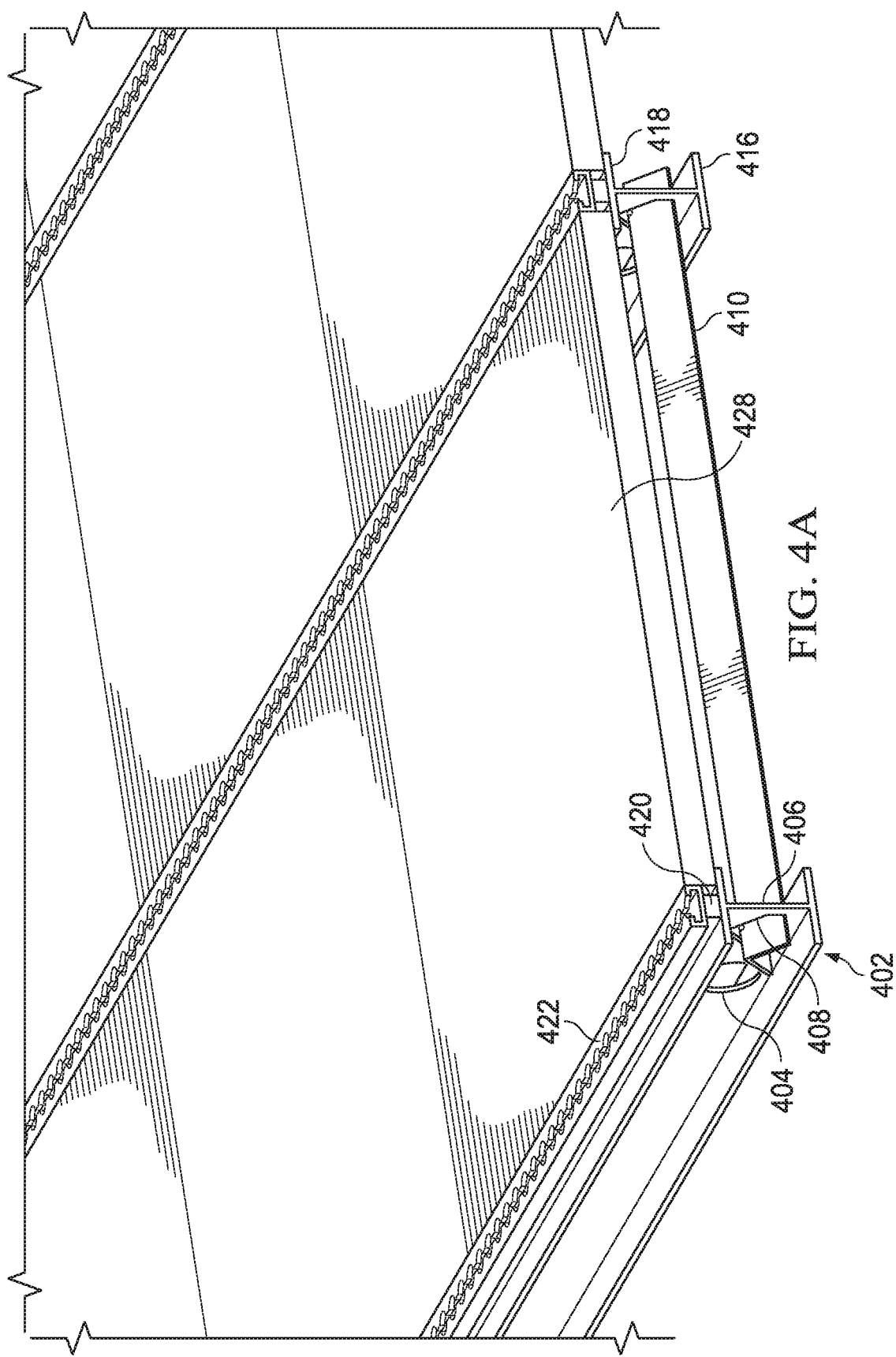
FIG. 4A illustrates a flooring system of a configurable VR environment model.

In order to provide the configurable VR environment model, the structures must provide ease of configurability between the model components. Referring now to FIG. 4A, there is illustrated the floor configuration. The floor configuration consists of a plurality of aluminum I-beams 402. The I-beam 402 comprises an I-shaped aluminum member that defines a plurality of holes 404 within the central portion 406. In one embodiment, the holes comprise two inch holes that are separated by 28 inch centers. The holes 404 enable for a wireless chase between sections. Thus, wires necessary for operating electronic components of the VR system and associated configurable VR environment model may run below the floor without interfering with gameplay or training protocols.

Figure 4B:
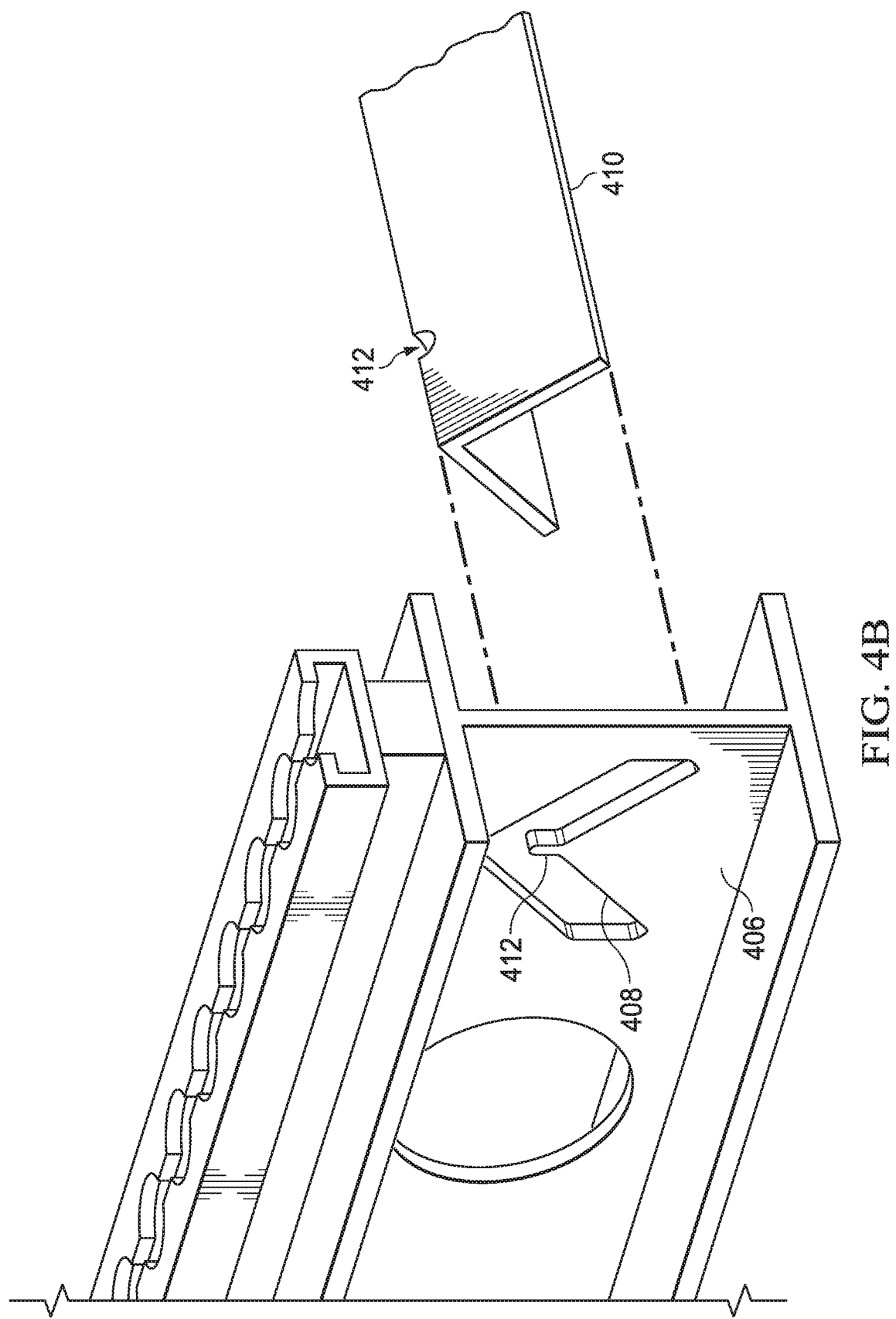
FIG. 4B illustrates the cross brace and cross brace mounting hole within an I-beam.

Referring now also to FIG. 4B, there is more particularly illustrated the cross brace 410 and associated cross brace slot 408. The cross brace 410 comprises an L-shaped aluminum member that includes a ¼ inch hole 412 located a distance from the end of the cross brace 410 at the connection axis of the two portions of the L-shaped cross brace. The central portion 406 of the I-beam 402 further defines a cross brace slot 408. The cross brace slot 408 defines a L-shaped opening large enough to receive the L-shaped cross brace 410. The cross brace slot 408 defines a pin 414 extending upward from the bottom angle connection point of the L-shaped slot. When the cross brace 410 is inserted into the cross brace slot 408, the pin 414 engages the hole in the cross brace slot 408. The locking pin 414 engages the hole 412 within the cross brace 410 to maintain the cross brace in a fixed position with respect to the I-beam 402. In one embodiment, the cross braces 410 maintain I-beams 402 at 24 inch centers. When multiple cross braces 410 are located in several places along the length of a pair of I-beams 402, a fixed flooring panel section is established. By tying several flooring panel sections together, a configurable VR environment model floor is established.

The I-beam 402 has a base member 416 which rest on the floor. A top member 418 has an aluminum bar 420 welded thereto. In one embodiment the aluminum bar comprises a ½ inch by three-quarter inch aluminum bar with the three-quarter inch surface being welded to the top member 418. An aluminum cargo track 422 is welded to the top surface of the aluminum bar 420. The aluminum cargo track 422 comprises a rectangular member defining an opening or slot therein along the longitudinal axis thereof. The aluminum cargo track 422 is welded to the top surface of the aluminum bar 420 along the bottom surface of one of the long sides of the rectangular aluminum cargo track. The top surface of the opposite long side of the rectangular aluminum cargo track 422 defines a slot 424 along the length of the cargo track. The slot includes a plurality of cam openings 426. The cam openings 426 are large enough to receive a cam disk from the cam lock clamp which will be more fully discussed hereinbelow with respect to FIGS. 11 and 12. The cam openings 426 are set on a 2 inch center. This enables a high level of precision and granularity when placing wall panels to create configurable VR environment models on the floor sections. Once inserted through the cam openings 426, a cam disk may be moved to a narrow portion of the slot between the openings to clamp an item in place.

Flooring within the floor sections consists of one inch plywood decking 428 that is laid on top of an edge of the top members 418 of the I-beams 402 between the aluminum cargo tracks 422. The thickness of the plywood decking 428 is such that the top surface of the plywood decking will be level with the top surface of the aluminum cargo track 422. While the discussed embodiment describes the use of plywood decking 428, other types of decking material may be utilized for the flooring as long as the material is strong enough to support the weight of individuals walking on the decking surface and light enough to enable the reconfiguration of the floor paneling by a single individual.

Figure 5:
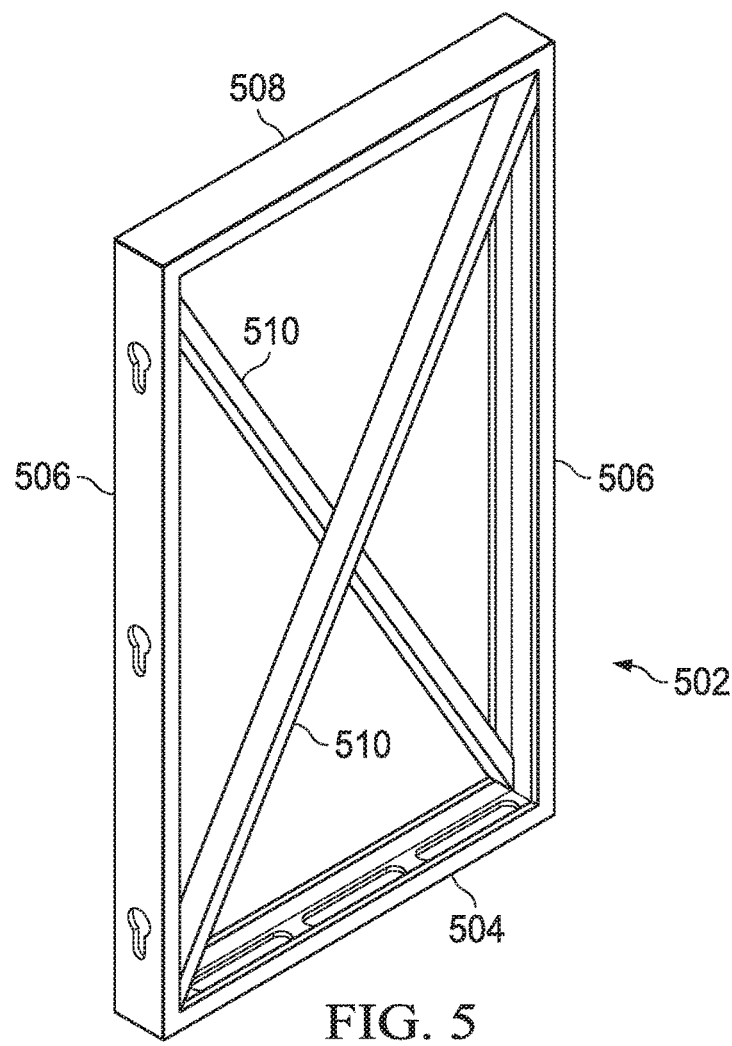
FIG. 5 illustrates a wall panel support structure of a configurable VR environment model.
Figure 6:
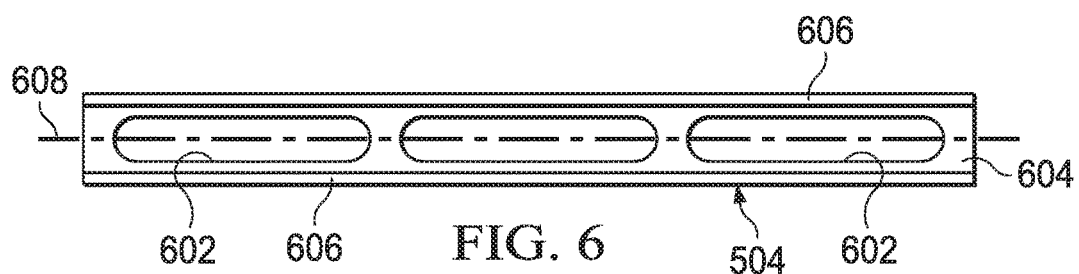
FIG. 6 illustrates a base support of the wall panel of FIG. 5.

Once the flooring sections are established within the configurable VR environment model, various wall panels may be configured on the flooring surface. Referring now to FIG. 5, there is illustrated a wall panel 502. Each wall panel 502 consists of a base member 504, two side members 506, a top member 508 and cross braces 510. The base member 504, shown also in FIG. 6, is a C-shaped aluminum beam including a base portion 604 and two side portions 606. The base portion 604 defines a plurality of elliptical slots 602. The elliptical slots 602 enable the base member 504 to be moved to a variety of positions along the longitudinal axis 608 of the C-shaped aluminum beam. The base member 504, side members 506 and top member 508 are welded together at their ends to form a rectangularly shaped wall panel 502 and the ends of cross braces 510 are welded to opposite corners of the rectangle in order to provide angular support to the wall panel structure.

Figure 7:
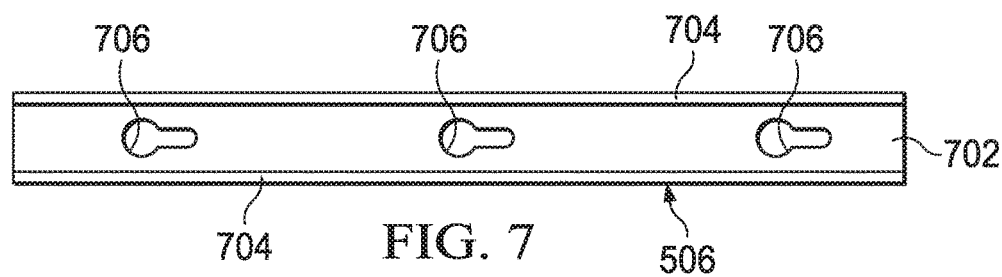
FIG. 7 illustrates a side support of the wall panel of FIG. 5.

Each wall panel 502 includes a pair of side members 506 that also comprise C-shaped aluminum beams as shown in FIG. 7. As with the base member 504, each side member 506 includes a base portion 702 and two side portions 704 within the C-shaped aluminum beam. The base portion 702 further defines a number of connecting slots 706 for interconnecting the wall panels 502 with adjacent wall panels or other types of vertical supporting members. The slots 706 are configured to receive a cam disk of the cam block clamp (see FIG. 11) and include an opening for inserting a cam disk and slot for receiving the cam shaft. The embodiment shown in FIGS. 5 and 7 include three connecting slots 706 for interconnecting the wall panels 502, but one skilled in the art will appreciate that additional, or fewer, slots may be utilized for interconnecting the wall panel with adjacent structures. The connecting slots 706 will be at a consistent placement with respect to adjacent wall panels 502 such that a cam lock clamp may be placed through aligned connecting slots 706 of adjacent side members 506 to enable connections therebetween.

Figure 8:
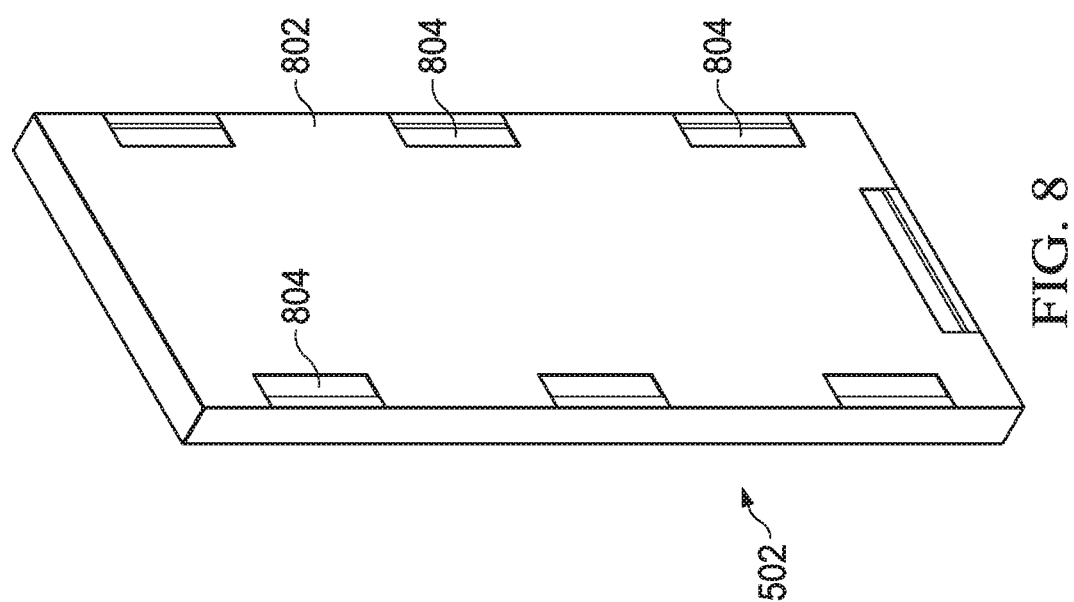
FIG. 8 illustrates a wall panel having a surface skin placed over the support structure.

As shown in FIG. 8, once the structural frame of the wall panels 502 have been created, covering panels 802 are connected to each side of the wall panel over the wall panel frame defined by the base member 504, side members 506, top member 508 and cross braces 510. The covering panel 802 defines a number of openings 804 therein. The openings 804 along the side members 506 enable for movement and positioning of the wall panel 502 when it is being moved between locations or positioned into a configurable VR environment model. An opening 804 along the bottom of the wall panel 502 near the base member 504 is used for similar purposes. The covering panels 802 additionally include a plurality of holes 806 therein forming a grid across the entire surface of the covering panel 802. The holes 806 are separated on a ¼ inch up to any size centers that will fit within the covering panel 802. The covering panels 802 are connected to the wall panel frame via connectors 805. The plurality of holes 806 enable various textures and items to be connected to the wall panel 502 or formed as an integral part thereof. Thus, by utilizing pegs on the backside of an item, the pegs may be inserted through the holes on the covering surface 802 to enable the item to be affixed to the wall. The material affixed to the wall may comprise textures such as a rock or wood wall, a window or other type of opening outline, or may be used for providing a shelf, mantle for a fireplace or any other texture which would need to be simulated within the real world to provide tactile feedback to a user in the VR world consistent with what they are viewing in the virtual world.

Figure 9:
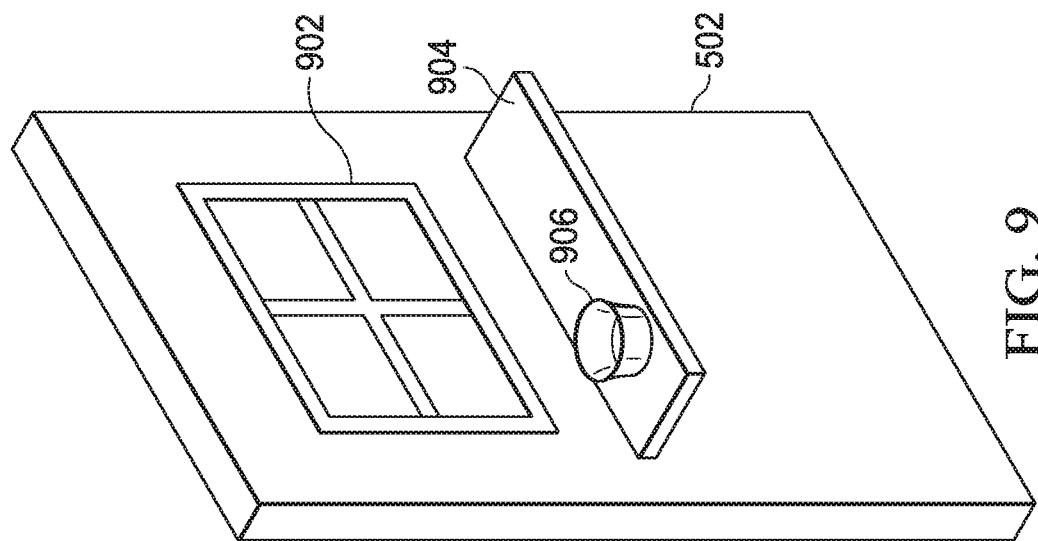
FIG. 9 illustrates a wall panel having particular textures applied thereto.

Referring now to FIG. 9, there is illustrated the manner in which textures may be inserted into the covering panel 802 using the plurality of holes 806 on the surface thereof. In FIG. 9, a window 902 has been created on the wall panel 502. The window 902 consists of a rectangular frame structure and cross pieces for creating a model of a window frame. Additionally, a shelf 904 has been inserted into the wall panel 502 to provide a surface below the window which may be touched or have items placed there on. The shelf 904 could additionally have items 906 placed there on that a user may interact with but the items 906 would need to be placed within a specific registered location of on the shelf 904 such that the item can be specifically located within the VR world being presented to the user through their VR headset. The item 906 could be registered by being placed within a specific location on the shelf 904 or alternatively, could include some type of transmitting device that enabled the system to determine a position of the item when it moves within the VR world in much the same manner that position of individuals interacting with the VR world have their position tracked.

Figure 10:
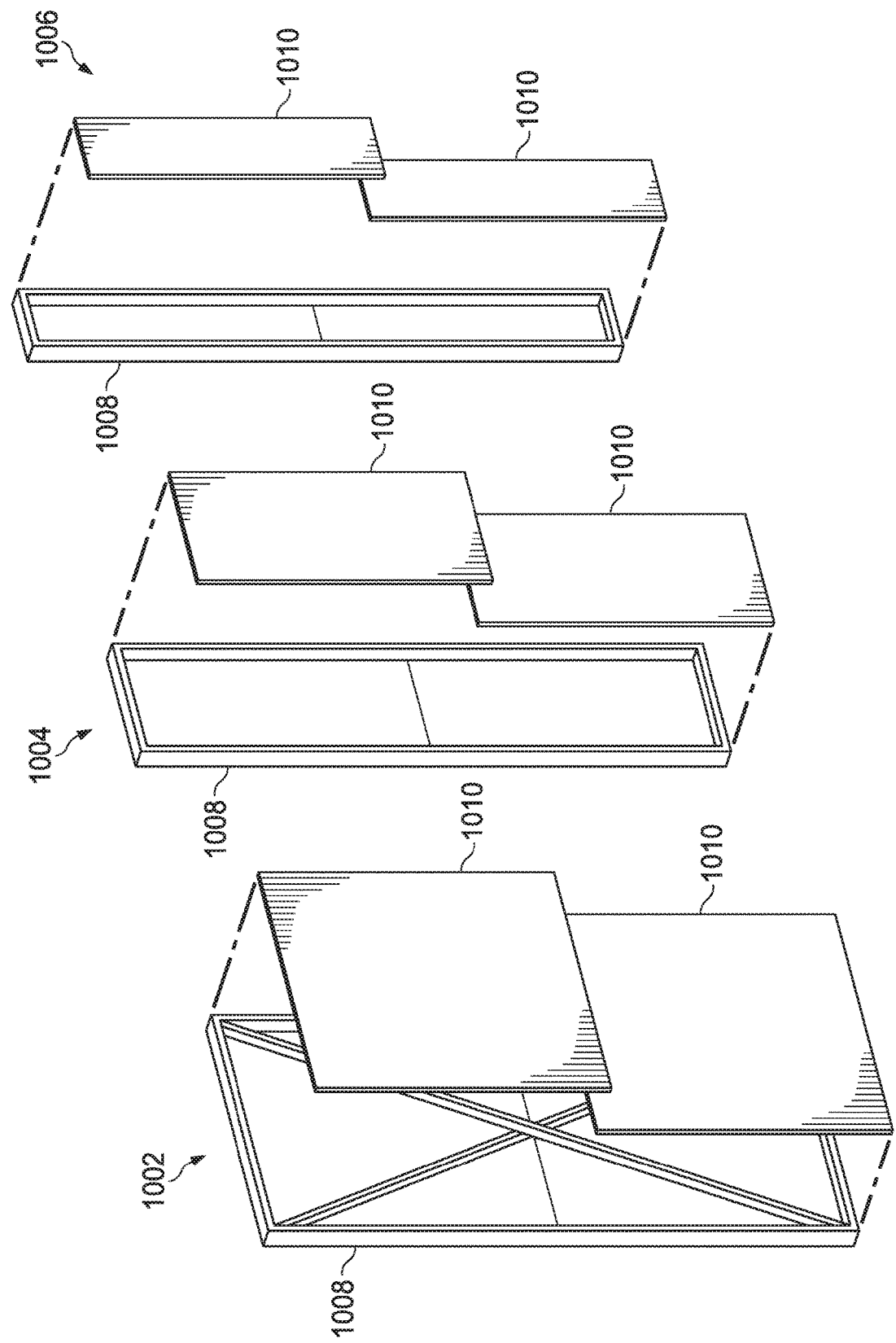
FIG. 10 illustrates various sized wall panels.

The wall panels 502 may be constructed in a variety of sizes in order to accommodate differing virtual-reality environment models as shown in FIG. 10. Wall panels 502 may be 3"×45"×96" 1002; 3"×22.5"×96" 1004; 3"×12"×96" 1006 or any other applicable size. Each of the wall panels 1002, 1004 and 1006 comprises the panel frame 1008 covered by a pair of panel coverings 1010. The covering panels 1010 comprise vacuum formed textured panels that may be quickly changed using panel quick connect fasteners 1012 to provide differing wall surface textures to suit various configurable VR environment models. The varying size wall panels enable the modeling of a variety of different configurable VR environment models for use with differing types of VR worlds.

While the above descriptions have envisioned a wall panel 502 including rigid base members 504, side members 506 and top members 508, the wall panel may also be construct did using flexible members that may be temporarily or permanently bent to a curved position. In this manner, the base member 504 and top member 508 could be curved to represent a curved representation in the configurable VR environment model such as a column, tree trunk or other curved surface. Additionally, the side members may also be flexibly bent in the vertical axis to create a curving surface such as a dome or archway rising above or away from the user in the virtual-reality environment. In this manner, curved surfaces may also be created in the configurable virtual-reality environment model rather than just being limited to planar surfaces. Alternatively, some or all of the base member 504, top member 508 and side members 506 may be constructed from rigid curved members to provide the same curved infrastructure in a more permanent form.

Figure 11:
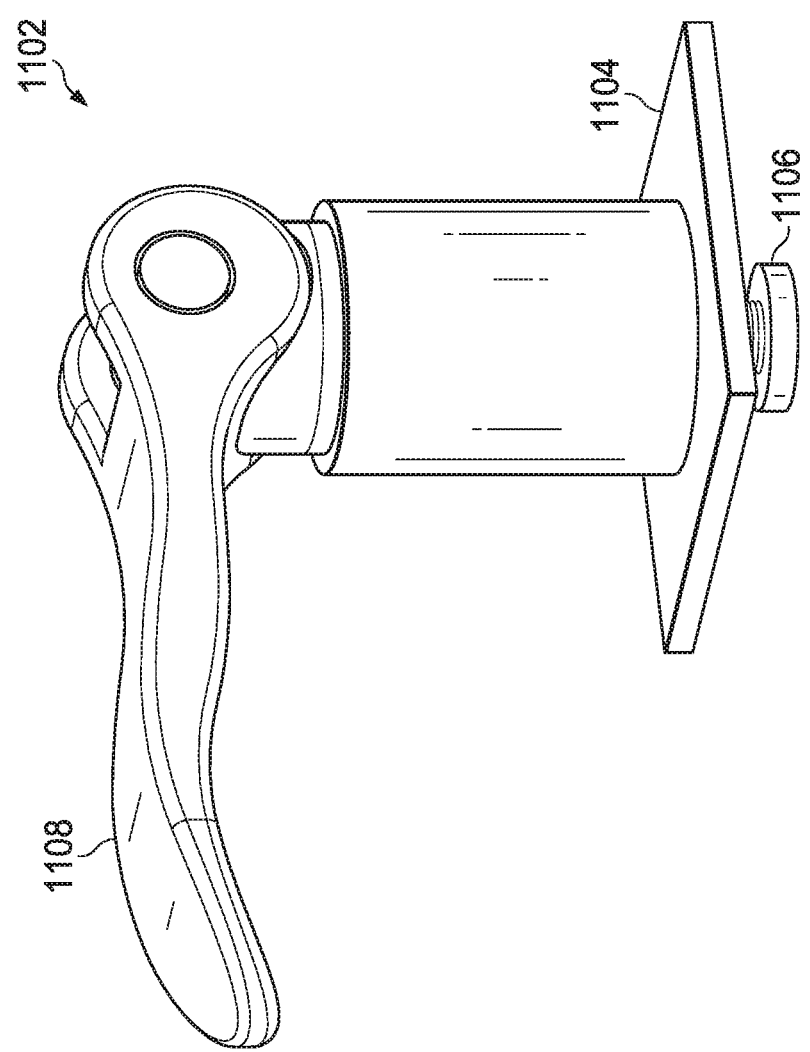
FIG. 11 illustrates a perspective view of a cam-lock clamp.

The wall panels 502 and I-beams 402 of the floor unit are interconnected using connecting clamps. Referring now to FIG. 11, there is an example of a particular embodiment of a clamp comprising a cam-lock clamp 1102. The cam-lock clamp 1102 comprises a base plate 1104 and a cam-lock disk 1106 located on a bottom side of the base plate 1104. The cam-lock disk 1106 fits through openings in for example the aluminum aircraft cargo track 422 of the I-beam 402 and the side members 506 of the wall panels 502. After being inserted through the openings, the cam-lock disk 1106 may be locked down on surfaces located between the cam-lock disk and the base plate 1104. The cam-lock disk 1106 is locked in place using a lever 1108. In the unlocked or raised position the lever 1108 surfaces may move freely between cam-lock disk 1106 and the base plate 1104. When the lever 1108 is in the locked or lowered position, the cam-lock disk 1106 and base plate 1104 will securely clamp to any surface located between the cam-lock disk and the base plate.

Figure 12:
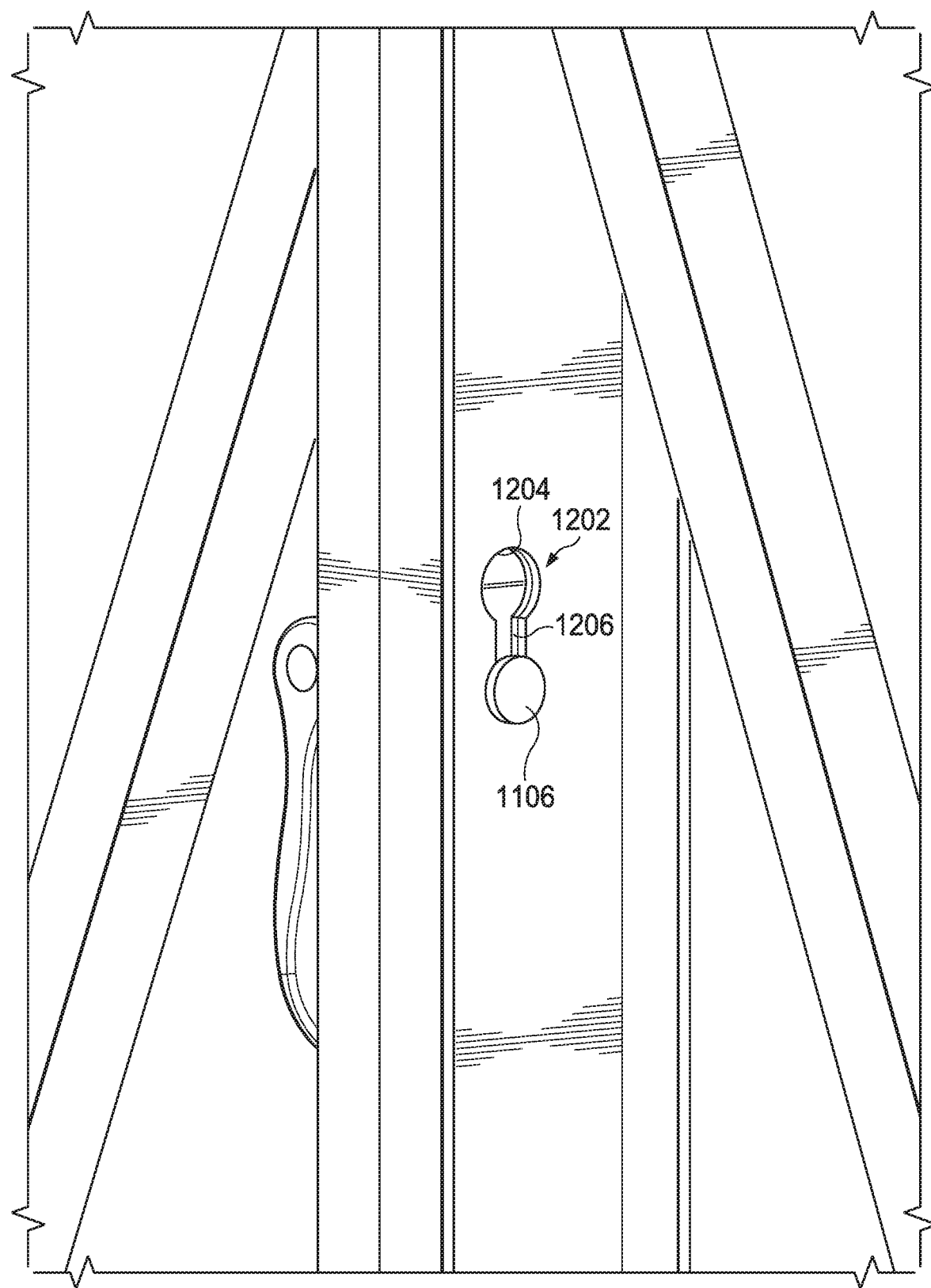
FIG. 12 illustrates a cam-lock clamp inserted within cam-lock holes in wall panels.

The manner of use of the cam-lock clamp 1102 is more fully illustrated in FIG. 12, wherein there is illustrated a cam-lock clamp 1102 inserted through locking holes 1202 of a wall panel. The locking hole 1202 includes a cam hole 1204 and slot 1206. The cam-disk 1106 of the cam-lock clamp 1102 is inserted through the cam holes 1204 of the wall panels and is lowered into the slot 1206 while the lever 1108 is in the open or unlocked position. After the clamp 1102 is moved into the slot 1206, the lever 1108 is moved to the locking position. This causes the cam disk 1106 to clamp together with the base plate 1108 and secure the side members of the wall panels together.

Figure 13:
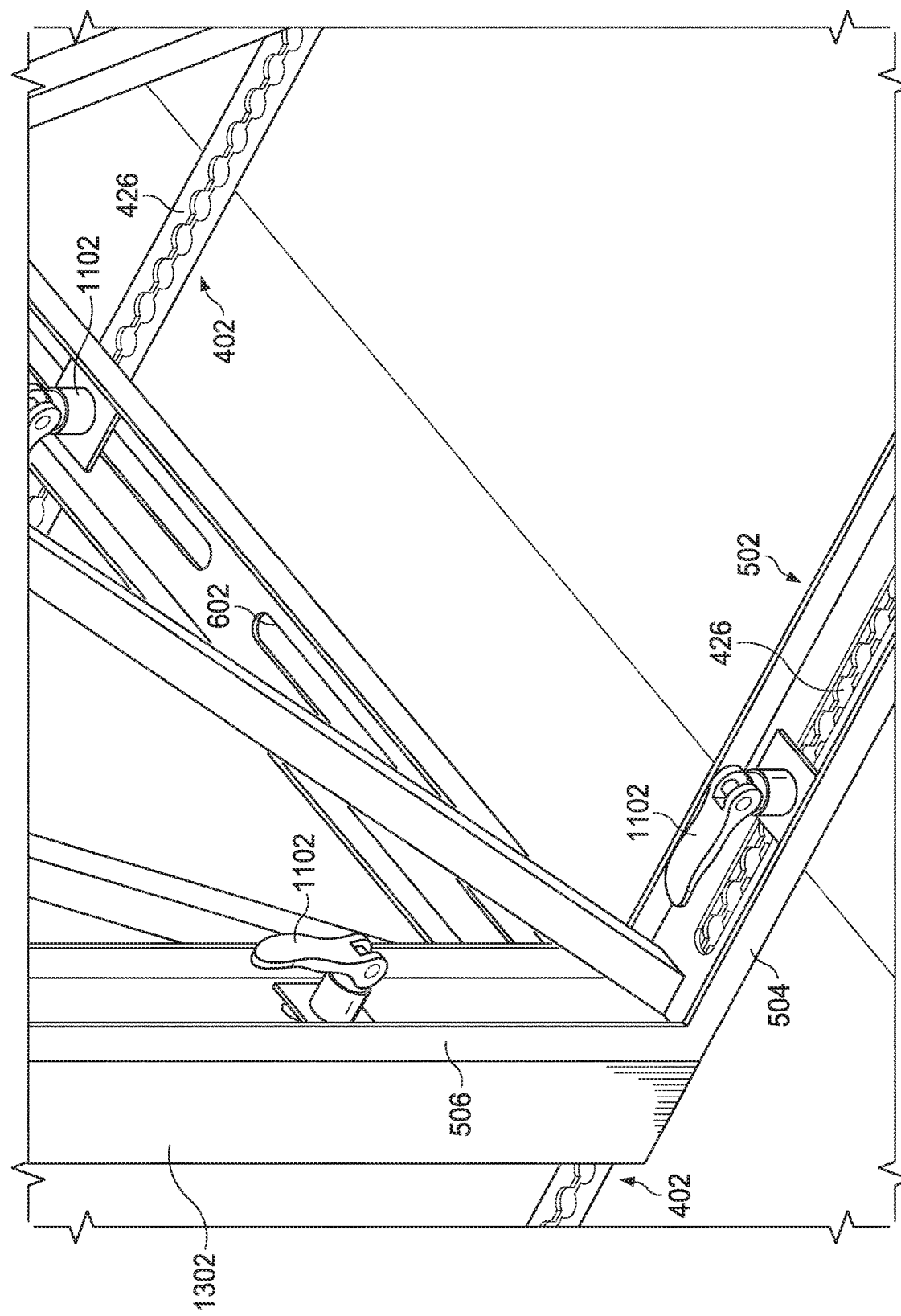
FIG. 13 illustrates the manner in which wall panels and floor panels are interconnected with each other in the configurable VR environment model.

Referring now to FIG. 13, the wall panels 502 and I-beams 402 may be interconnected with each other utilizing the cam-lock clamps 1102. The wall panels 502 are connected to the I-beams 402 by placing the slots 602 of the base member 504 of the wall panel over a particular cam opening 426 within the cargo track 422 of the I-beam 402. As discussed previously, the cam openings 426 are separated by two inch centers. This enables the wall panels 502 to be positioned in two-inch increments enabling a high level of precision in the wall panel placement. When the wall panel 502 is located in a desired location and the slot 602 is aligned with one of the cam openings 426, a cam-lock clamp 1102 is placed such that the cam-lock disk 1106 inserts through one of the cam-lock holes 426. The lever 1108 of the cam block clamp 1102 may then be moved to a lock position in a narrower portion of the cargo track 422 to clamp the base member 504 of the wall panel 502 to the floor. The base plate 1104 of the cam-lock clamp 1102 and the cam disk 1106 clamp the base member in the cargo track 422 between them to securely fasten the wall panel member 502 to the floor. The two inch centers of the cam openings 426 enable the wall panels 502 to be placed in horizontal, vertical and angled orientations with respect to the cargo tracks 422 and provide a variety of levels of configurability of the wall panels. The combination of the openings 426 within the cargo tracks 422 and the slots 602 of the base members 504 allow for a great deal of movement flexibility in the placement of the wall panels 502. The large number of openings 426 within the floor cargo tracks 422 allow the placement of the wall panels 502 at a large number of locations and in a variety of orientations with respect to the tracks. The slots 602 allow for a large degree of movement along the axis 602 of the base member to allow the wall panel placement to be finely tuned to meet the requirements of the configurable VR environment model.

The side members 506 of the wall panel 502 may interconnect with other wall panels or vertical support members 1302 as will be more fully described hereinbelow. The side members 506 interconnect with other wall panels 502 or vertical support members 1302 using the cam-lock clamps 1102. With the lever 1108 in the unlocked position, the cam-lock disk 1106 is located in a position that will pass through the openings 804 within the side members 506 or vertical support members 1302. The cam-lock member 1106 may then be moved to a position that will not pass through the opening 804 and the lever 1108 is moved to the locking position. This locks the side members 506's or vertical support member 1302 between the base plate 1104 and cam-lock member 1106 to help maintain the wall panel 502 in an upright position.

Figure 14:
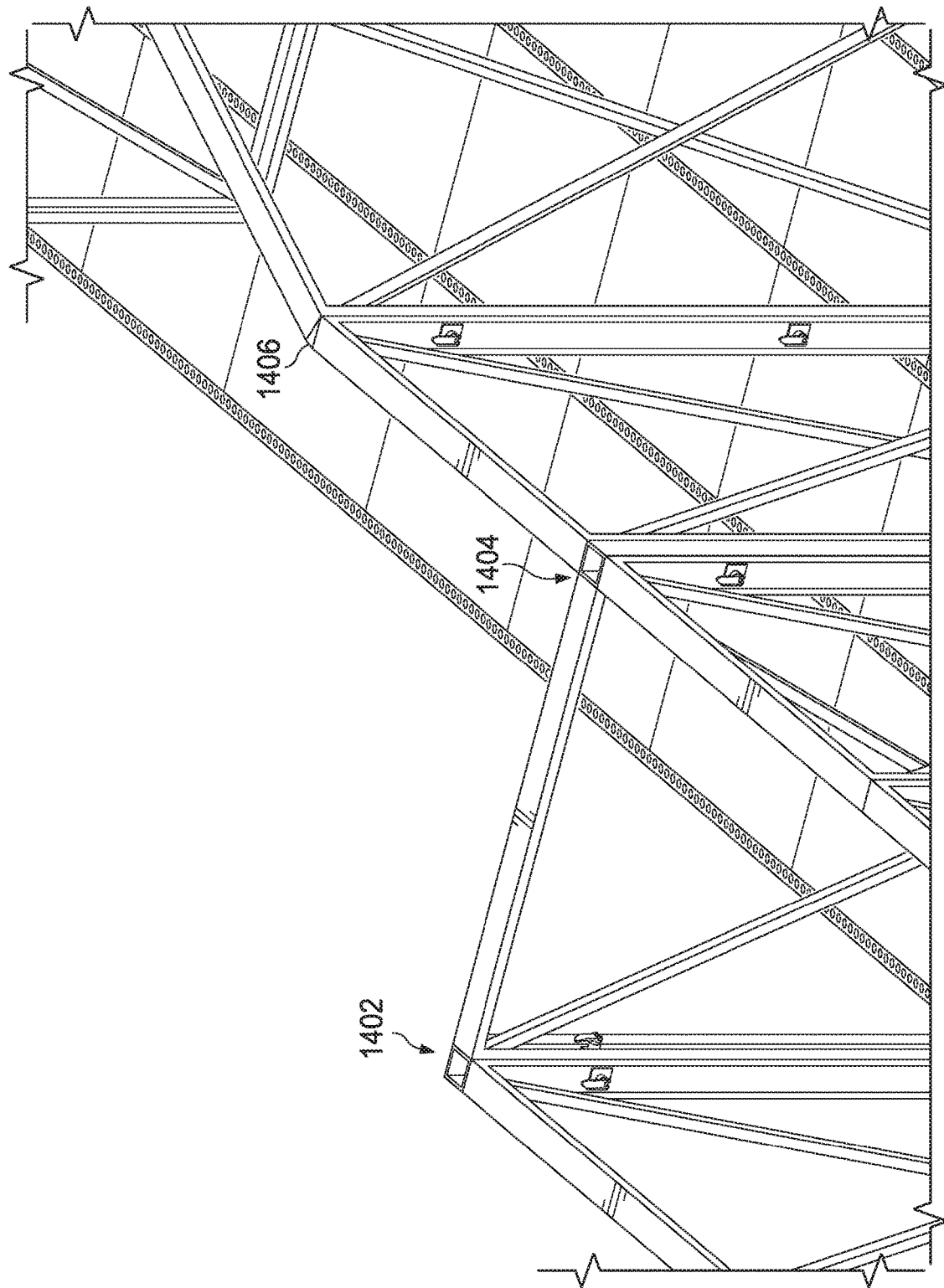
FIG. 14 illustrates various junction connections for wall panels.
Figure 15:
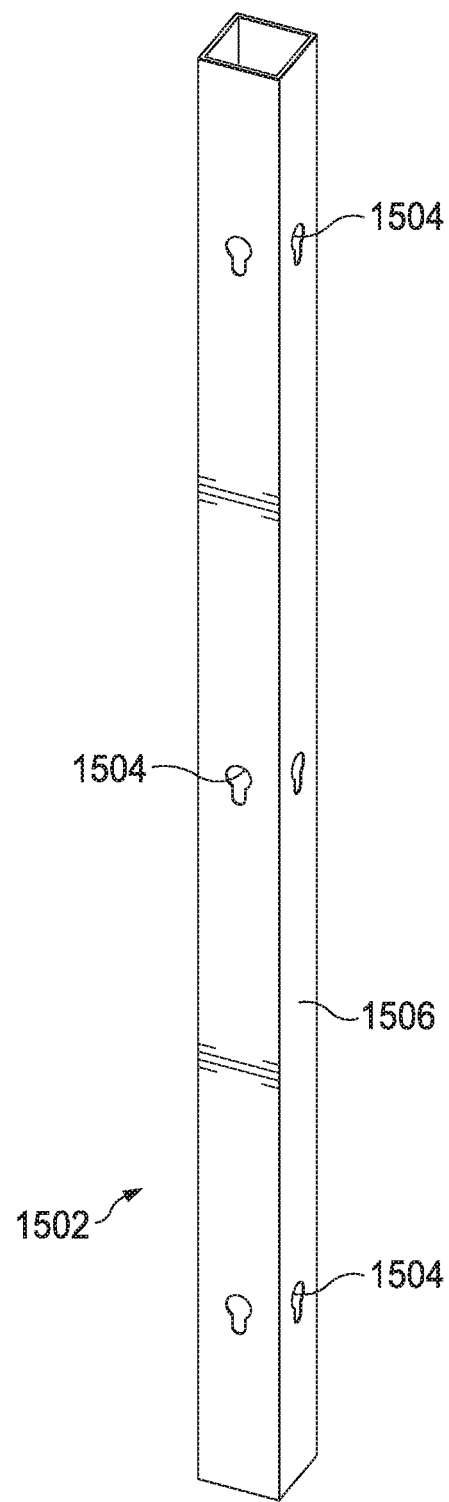
FIG. 15 illustrates a 90° support member for interconnecting wall panels.

Referring now to FIG. 14, there is provided more detailed information regarding the manner for interconnecting side members 506 of wall panels 502. FIG. 14 illustrates a number of interconnected wall panels 502 in a 90° connection 1402, a T-Junction connection 1404 and an angled connection 1406. The 90° connection 1402 and T-junction connections 1404 are achieved using a vertical support member 1502 as shown in FIG. 15. The vertical support member 1502 comprises a rectangular member 1506 made from aluminum tubing. Each of the four sides of the rectangular member 1506 defines multiple cam openings 1504 therein for receiving the cam disk 1106 of the cam-lock clamp 1102. The rectangular member 1506 may have a side member 506 of a wall panel 502 clamp thereto using cam-lock clamp 1102. The openings 1504 of the rectangular member 1506 are positioned to align with corresponding openings 706 of the side members 506 of the wall panel 502. Thus, by inserting the cam disk 1106 through the aligned holes 706 and 1504 placing the lever 1108 in the locking position, multiple cam-lock clamps 1102 may be used to secure wall panels 502 in a 90° connection 1402.

In a similar manner, a T-junction connection 1404 may be achieved using the vertical support member 1502. In the case of a T-junction connection 1404, the rectangular member 1506 has wall panels 502 connected to three sides thereof. As before, the holes 1504 within the vertical support member 1502 are aligned with corresponding openings 706 of a side member 506 of a wall panel 502. A cam-lock clamp 1102 is inserted through the aligned holes and locked into place to lock the wall panel in an upright position. In a similar manner to that described with respect to the T-Junction connection 1404, wall panels 502 could also be connected to each side of the vertical support member 1502 to provide a four wall panel intersection connection if needed.

Figure 16A:
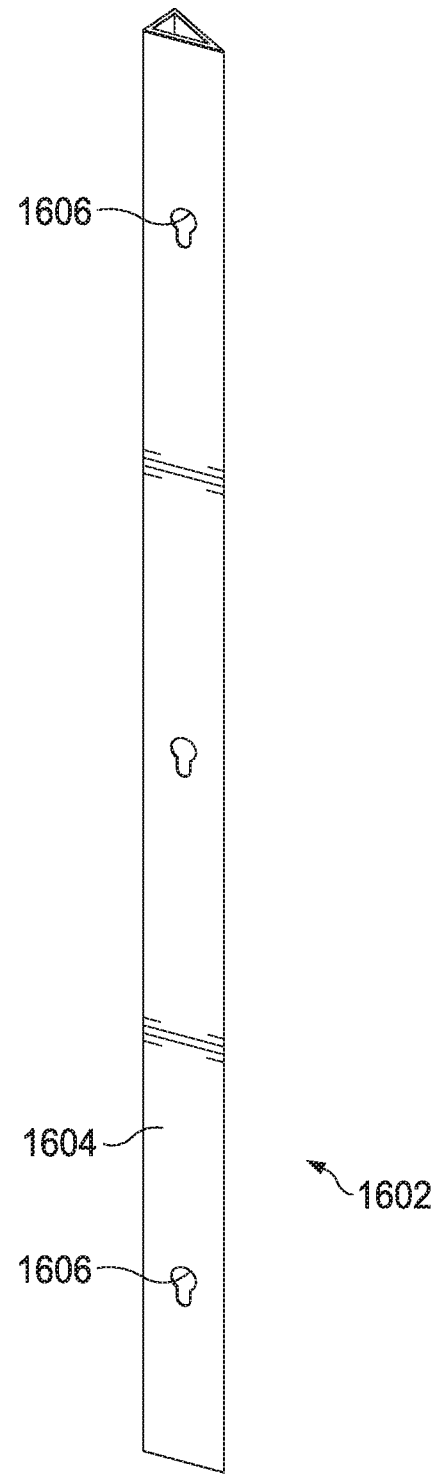
FIG. 16A illustrates an angled support member for interconnecting wall panels.

An angled connection 1406 utilizes an angled vertical support member 1602 as illustrated in FIG. 16A. The angled vertical support member 1602 comprises a triangular member 1604 including three sides. Either two of the sides, or all three of the sides define openings 1606 therein. Each of the openings 1606 align with a similar opening 504 within the side member 1506 of the wall panel 502. A cam-lock clamp 1102 is inserted through the aligned holes and the lever moved to the lock position to secure the wall panel 502 with the angled vertical support member 1506. The angle provided by the angled connection 1406 of FIG. 14 comprises a 22.5° angle connection. However, angles of various other degrees may also be implemented within the angled vertical support member 1506 that are consistent with the two inch centers provided by the I-beams.

Figure 16B:
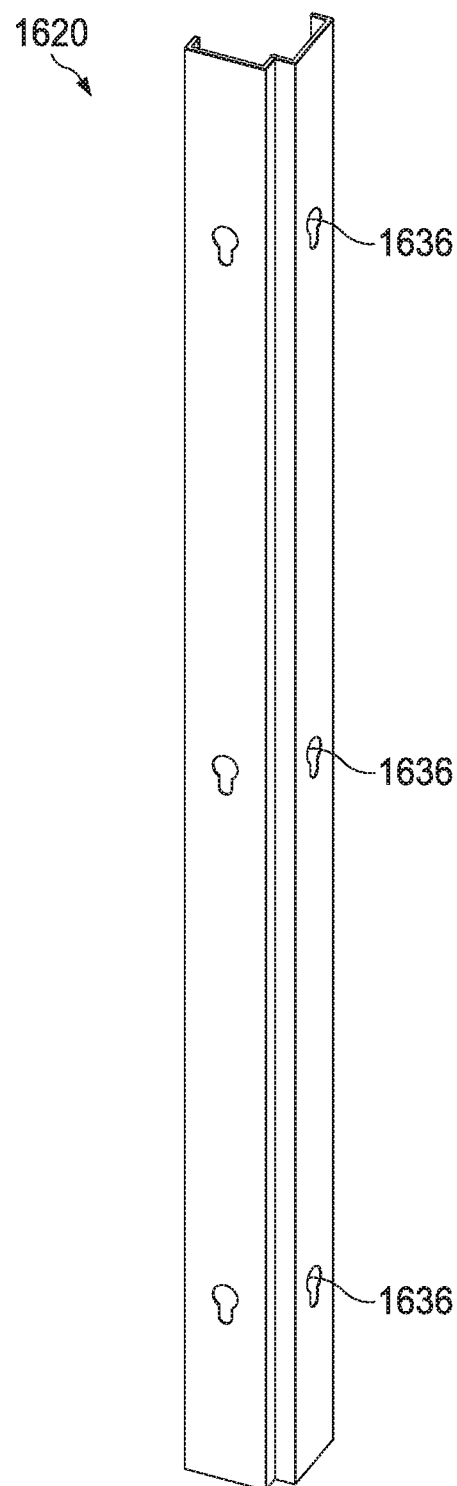
FIG. 16B illustrates a perspective view of a hinged vertical support member.
Figure 16C:
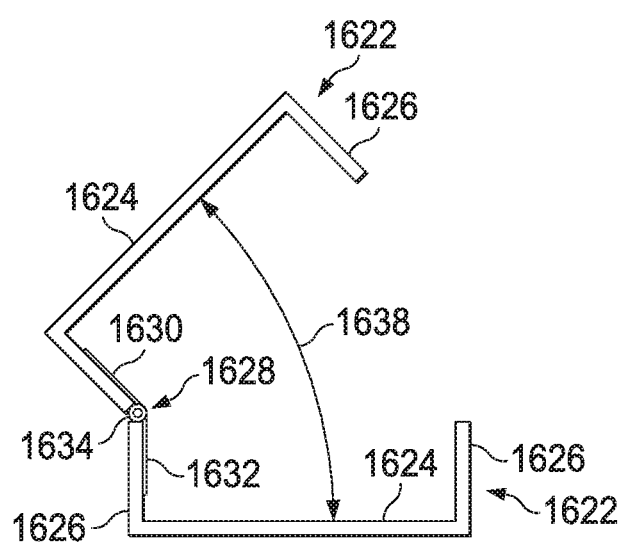
FIG. 16C illustrates an end view of the hinged vertical support member.

Referring now to FIGS. 16B and 16C there is illustrated a further manner for interconnecting wall panels 502 together. Rather than directly connecting the side members 506 together or connecting the side member to a vertical support member 1502 or angled vertical support member 1602, a hinged vertical support member 1620 may be utilized. The hinged vertical support member 1620 comprises first and second U-shaped aluminum members 1622 having a base portion 1624 and two side portions 1626 extending perpendicularly from each edge of the base portion. The U-shaped aluminum members 1622 are interconnected by a hinge mechanism 1628. The hinge mechanism 1628 comprises a first plate 1630 that connects to a side portion 1626 of a first U-shaped aluminum member 1622 and a second plate 1632 that connects to a side portion of a second U-shaped aluminum member. The first plate 1630 and second plate 1632 are connected at a rotating connection 1634.

The base portion 1624 of the U-shaped aluminum members 1622 defines a plurality of connection holes 1636 therein. The connection holes 1636 comprise the hole and slot configuration as described above with respect to the wall panel side members 506 that are placed and sized to align with the corresponding connection holes located on the side members 506 of a wall panel 502 or the vertical support members. The connection holes 1636 on the U-shaped aluminum members 1622 are aligned with the corresponding connection holes on the side panel 502 or vertical support members and interconnected with each other using a clamping mechanism 1102. Once connected, the wall panel may be moved along an axis 1638 to be placed at any desired angle between 0° and 90°. While FIGS. 16B and 16C have illustrated the use of a single hinge mechanism 1624, in alternative embodiments a separate smaller hinge mechanism may be separately located on the U-shaped aluminum members 1622 rather than using a single hinge mechanism.

Figure 17:
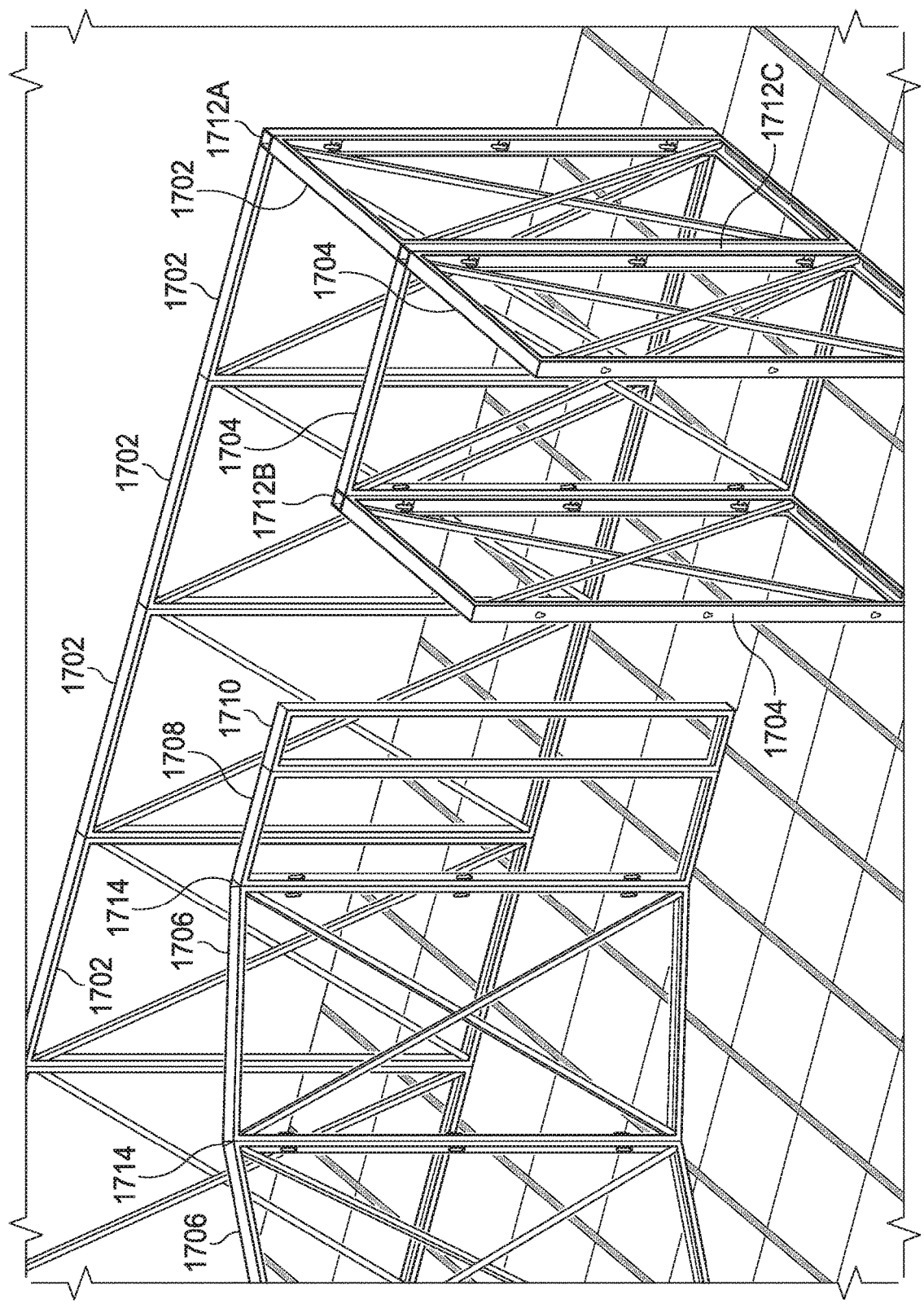
FIG. 17 illustrates an example of a configurable VR environment model constructed using wall panels and floor panels.

Using the above described components for designing a configurable VR environment model, a structure such as that provided in FIG. 17 may be provided. A structure comprising a plurality of full-size wall panels 1702 is provided that creates an exterior wall. A small closet area is defined by panels 1704. An interior wall is provided by a pair of full-size panels 1706 and a 22 and a half-inch panel 1708 and 12 inch panel 1710. Support members provide for both 90° corner connections at 1712A and 1712B and a T-junction at 1712C. Finally, 22.5° angle corners are provided at angled vertical connectors 1714. The angled corners allow for a more gradual change in direction of the wall. Once the wall panels have been erected, the coverings may be placed over the support structures in order to provide the desired wall textures.

Figure 18:
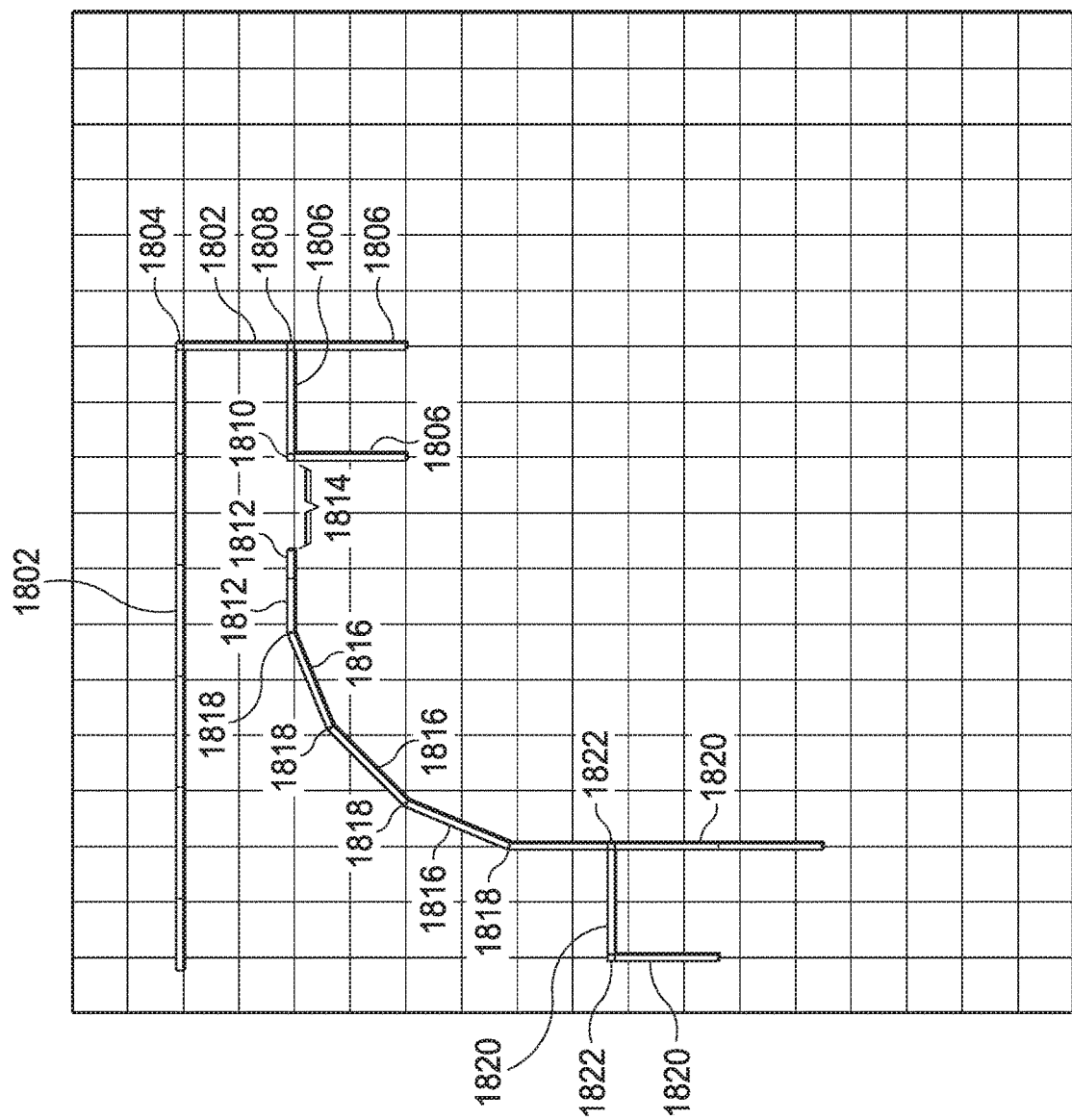
FIG. 18 illustrates a top view of a configurable VR environment model.

FIG. 18 provides a top-down view of the structure created in FIG. 17. The exterior walls 1802 are created by a series of interconnected wall panels that are connected at a 90° connection using a vertical support member at point 1804. A small closet is created by panels 1806 provided via a T-junction using a vertical connection member at point 1808 and a 90° connection using a vertical support member at point 1810. Panels 1812 comprise smaller size wall panels as described hereinabove to provide the door opening 1814. A curved wall structure is provided using a series of wall panels 1816. The panels forming the curve are interconnected via angled vertical supports at points 1818. The angled vertical supports provide a 22.5° angle between adjacent panels to provide the slowly curving/angled surface. Utilizing the slots within the base members of these wall panels and the holes within the track of the I-beams of the floor, the wall panels 1816 may be placed in a desired fashion to provide the curving wall structure. Finally, an additional closet structure is provided using panels 1820 that are interconnected via vertical connection members at points 1822.

The configurable VR environment model illustrated with respect to FIGS. 17 and 18 has the advantages of being quickly built, broken down and reconfigured by a single individual. The quick release clamping mechanisms and aluminum support structure enable the components to be easily moved by the single individual without requiring the use of large crews for building, breakdown and reconfiguration. Additionally, the design of the components does not require the use of any specialized tools for building the configurable VR environment model. The flooring sections comprised of the I-beams 402, cross braces 410 and panels 428 may be put together by hand without the need for any specialized tooling. The wall panels 502 and vertical support members may be placed and interconnected with each other using only the panels, vertical support members and clamping mechanisms. This ease of building and reconfigurability by a single individual without requirements of specialized allow for the creation of a variety of configurable VR environment models that enable the VR system to be utilized in a variety of gaming and training environments that are ever-changing and deliverable to a variety of locations.

The configurable components described hereinabove provide a number of benefits to enable the creation of a configurable virtual-reality environment that when paired with a virtual-reality system that displays a virtual-reality environment to a user through a VR headset provide a much more immersive user experience due to the ability to view the virtual-reality world through the headset and feel the virtual-reality world through the configurable VR environment model. The creation of the configurable VR environment model may be achieved as generally shown in FIG. 19. VR world data 1902 describing things such as locations of walls, doors, windows and other physical structures within a VR world may be paired with information regarding the configurable components 1904, such as wall panel, floor I-beam, vertical support structures, etc. described hereinabove to enable the generation of the configurable VR environment model 1906. Upon generation of the model 1906 items such as a parts list of the configurable components 1904 may be created in order to build the environment model for use by individuals.

Referring now to FIG. 20, there is illustrated a flow diagram of a process for creating the configurable VR environment model using the system described herein. Initially, at step 2002 data relating to the VR world to be modeled is received. This information may be physically delivered to a location that provides the configurable VR environment model components or this information could be downloaded via a website or some other type of network connection. This data comprises information defining the physical structures within the VR world that may have physical components modeled therefore using the described configurable components. The received VR world data is used to map at step 2004 a real world model that represents the VR world components that would the displayed to a user through a VR headset. The hardware necessary to create the real world model is determined at step 2006. This process would involve the determination of the wall panels 502, I-beams 402, vertical support members 1502, angled vertical support members 1602 and wall panel coverings 1010 necessary for building the configurable VR environment model that has been generated responsive to the provided VR data. The determined hardware components are pulled at step 2008 to enable the building of the configurable VR environment model. The pulled hardware and instructions for building the generated configurable VR environment model are delivered to a location in which the VR system and model are to be configured. This can comprise a business location, remote location or any other physical site having sufficient area for setting up the configurable VR environment model. The configurable real world environment model is built at step 2012 to provide the physical aspect to the virtual-reality world environment presented to users through, for example, some type of VR headset.

FIG. 21 is a flow diagram describing the process from the viewpoint of a customer that would be ordering the configurable VR environment model for installation at a location of their choosing. The customer initially uploads their virtual-reality data describing the world they wish to create a physical model for at step 2102. Responsive to the provided VR data using the procedure more fully described respect to FIG. 20, the information necessary to generate the configurable VR environment model is generated and provided back to the customer such that the hardware list and associated instructions for the model are received by the customer at step 2104. The customer reviews the list and model and if desiring to continue, proceeds to order the necessary hardware for building the configurable VR model at step 2106. The customer receives the can hardware and configurable model plan at step 2108 responsive to their order that enables them to build the configurable VR environment model at step 2110 in accordance with the provided plan using the provided hardware components.

Figure 22:
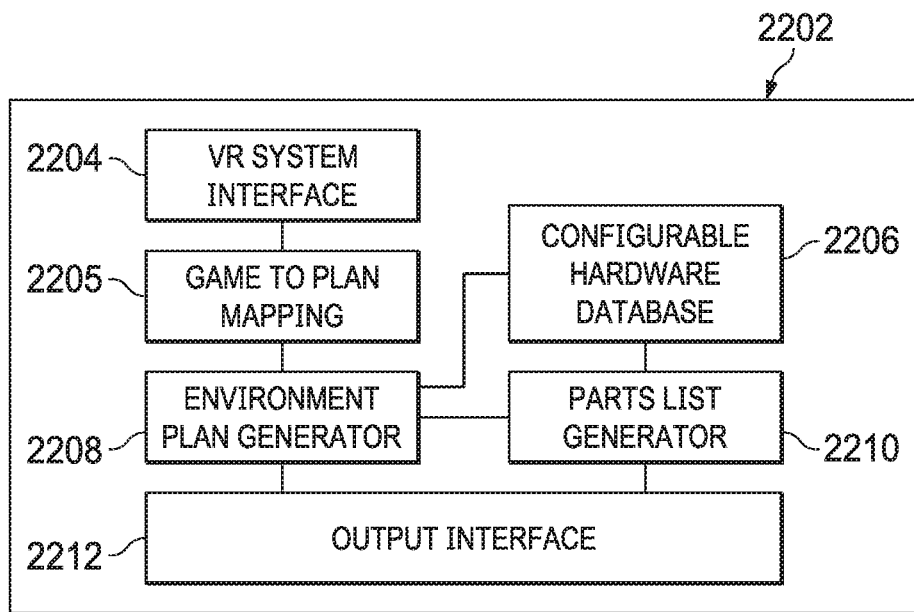
FIG. 22 illustrates a system for generating a plan and parts list for a configurable VR environment model responsive to provided VR world data.

Referring now to FIG. 22, there is illustrated a functional block diagram of a system for generating a VR environment model plan and parts list in accordance with the system described hereinabove with respect to FIGS. 20 and 21. The VR environment model plan generation system 2202 includes a VR system interface 2204 that provides a connection to receive virtual-reality world implementation data from a VR system. This data would provide information relating to structures such as walls, doors, windows, etc. within the virtual-reality world for which a configurable VR environment model must be created. The VR data downloaded from the VR system is mapped from the virtual reality word to the real world using the Game to Plan Mapping functionality 2205. The Game to Plan Mapping functionality takes the VR world information and maps it to an implementation in the physical world. Thus the mapping functionality would determine that a physical wall was located at a particular point, that a door was located a predetermined distance from one end of the wall, that a second wall is located a predetermined number of feet from this wall, etc. The mapping functionality 2205 would generate sufficient indexing and reference points between all of the structures within the VR world such that the same structures can be described within the physical world. This process can be accomplished for any gaming environment, VR or otherwise. A configurable hardware database 2206 provides data with respect to all of the available components for building a configurable VR environment model. The database 2206 would include information on the wall panels, I-beams, sensors, tactile feedback devices and other type of components which are available for use in the building of the configurable VR environment model. Various ones of these components have been discussed hereinabove, however it should be realized that other types of components may be utilized.

A configurable VR environment plan generator 2208 utilizes information provided from the Game to Plan Mapping functionality relating to the physical mapping of the virtual-reality environment to the physical world and the available hardware components from the configurable hardware database 2206 to generate a plan for a configurable virtual-reality environment model. The plan would illustrate the placement of floor section components, wall panels, vertical member supports, angled vertical supports and other physical components that provide a physical model of the virtual-reality world illustrated in the virtual-reality data that has been provided. The plan will illustrate the placement of these real-world components such that user may receive tactile response when touching a wall that has been placed in a physical location to correspond to a wall projected to the user through the virtual-reality system. The plan would designate the particular components to be utilized in constructing the model and illustrate their placement with respect to other components in the model. This would enable an individual to easily construct the designated configurable VR environment model.

The parts list generator 2210 utilizes information from the generated VR environment plan provided by the environment plan generator 2208 and the available hardware components from the database 2206 to generate a complete parts list. The parts list would comprise a list of wall panels and their associated sizes, the number of I-beams and cross braces, the number of panel coverings of particular textures and other available components that would be necessary for constructing the configurable virtual-reality environment model according to the plan generated by the plan generator 2208. The parts list would list the number of items grouped by type and provide the necessary number of components for implementing the plan. The parts list provided by the parts list generator 2210 enables an individual constructing a configurable VR environment model to confirm that they had the components necessary for constructing the model, or enable the company providing the components to have a list to work from for pulling the hardware that is to be provided to a customer for the construction of a particular VR environment model. The model plan generated by the environment plan generator 2208 in the parts list generator 2210 may be provided for use by an individual through an output interface 2212. The output interface 2212 may connect to a display, printer, network connection, etc. depending upon the manner in which the data that has been generated is to be utilized.

Figure 23:
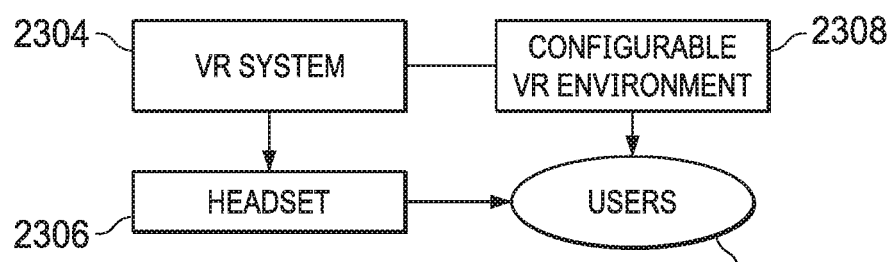
FIG. 23 illustrates the manner in which a VR system and a configurable VR environment model interact with a user.

Referring now to FIG. 23, there is illustrated the manner in which the above systems interact with each other to provide a more immersive virtual-reality experience to users 2302. A VR system 2304 generates a VR world that is projected as images to a headset 2306. The visual VR world projected to the headset 2306 from the VR system 2304 enables the user 2302 to visually discern the virtual-reality world elements that are being projected into the headset. Combined with the visual data provided to the user 2302 through the headset 2306, the configurable VR environment model 2308 may be interacted with by the user 2302. The configurable VR environment model 2308 allows the user 2302 to physically touch the structures that are visually discerned within the headset 2306 to provide a more immersive virtual-reality experience. The configurable VR environment model 2308 is constructed based upon data provided from the VR system 2304 that enables the placement of the physical structures in a manner that will correspond with the user interactions within the virtual-reality world displayed within the headset 2306. Thus, the user can both touch and see the virtual-reality world that is being experienced.

Figure 24:
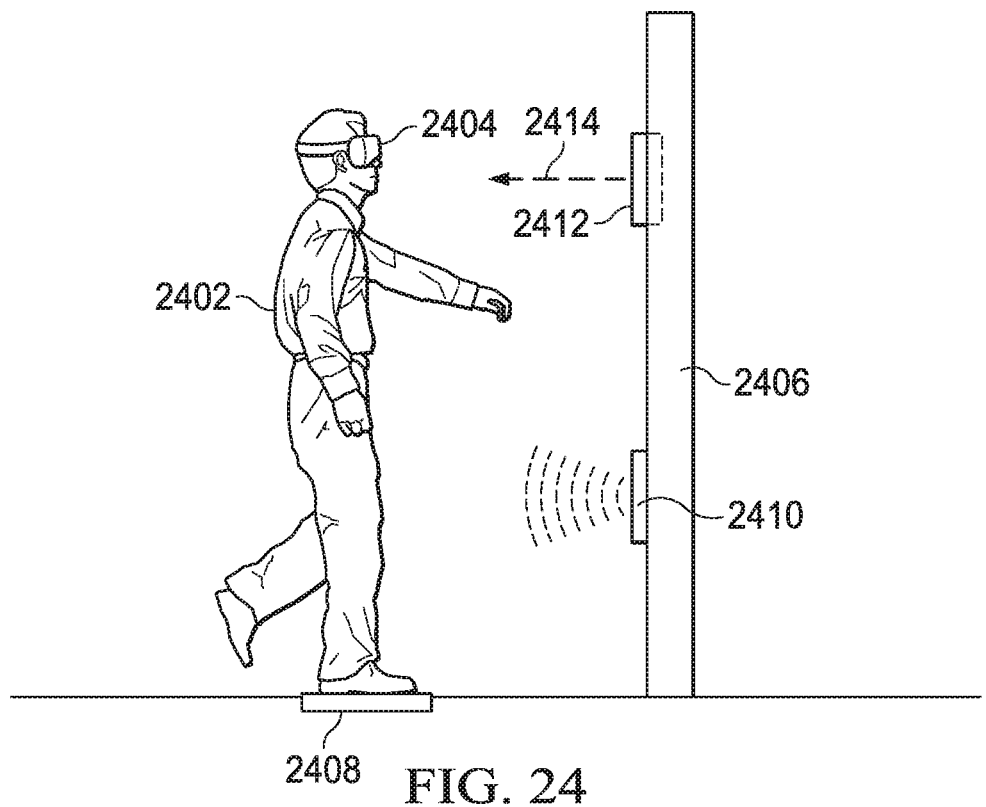
FIG. 24 illustrates a further embodiment for implementing sensors and physical world interactions with a user in the configurable VR environment model.

In addition to providing the physical structures such as floors, walls, doors and windows that a user may tactilely interact with in the configurable VR environment model, further feedback may be provided to a user using a combination of sensors and physical feedback as shown in FIG. 24. A user 2402 wearing a virtual-reality headset 2404 approaches a structure of the configurable VR environment model such as a wall 2406. Sensors detect the user 2402 as they approach the 2406. The sensors may take the form of a floor mounted pressure sensor 2408 that is actuated when a user physically stands upon the pressure sensor or, alternatively, a proximity sensor 2410 may detect the presence of the user 2402 as they approach a structure such as a wall 2406. The proximity sensor 2410 may utilize RF or optical feedback signals for detecting the presence of the user 2402. The pressure sensor 2408 or proximity sensor 2410 upon detection of an approaching user 2402 provides an actuation signal to an environmental feedback device 2412. Upon receipt of the actuation signal, the environmental feedback device 2412 will provide an environmental output 2414 that interacts with the user 2402. The environmental feedback device 2412 may comprise any number of devices such as a fan for blowing air on the user 2402, a heat lamp for projecting heat waves toward the user, a spray bottle for squirting a liquid on the user or any other similar type devices.

In this manner, the user 2402 is able to experience a simulated environmental interaction caused by approaching a particular structure. Thus, if the user 2402 was approaching a window the sensors 2408, 2410 could detect the user's presence and turn on a fan that blows air on the user simulating a breeze coming through the window. Alternatively, if the user were approaching a fire in the VR world, the sensors 2408, 2410 connecting the proximity of the user could turn on a heat lamp to cause the user to experience the heat from the fire. Similarly, the spray bottle could be used for spraying water on a user who was near an opening during a rainstorm or running water that might splash onto the user based upon their position within the virtual-reality world. The combination of sensors and environmental feedback devices 2412 further improve the immersive experience of the user within the virtual-reality. The sensors 2408, 2410 may also be used to control the environmental feedback devices 2412 to provide other types of feedback such as making a wall panel feel warm or cold to the touch to better reflect the information being provided through the VR headset 2404.

Figure 25:
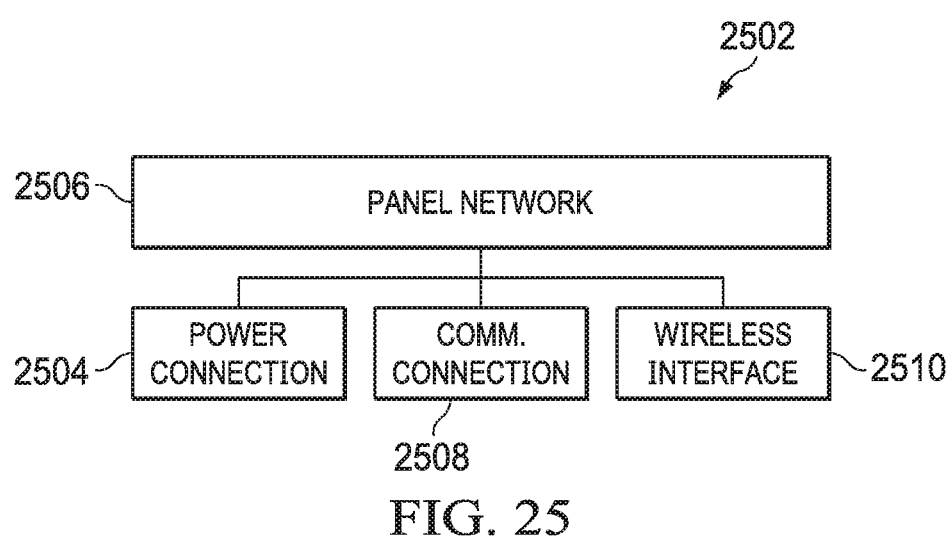
FIG. 25 illustrates a wall panel with a control system interface.

The individual wall panels 502, as described hereinabove, may be configured to include sensors and other environmental feedback components to provide an improved virtual-reality experience to the user interacting with a wall panels. As shown in FIG. 25, each of the wall panels 502 can include an interface 2502 enabling interconnect ability of the wall panel with a centralized control system. A power connection 2504 provides a standard power connection to provide electrical power to all electrical and electronic components interconnected with a panel network 2506. The power connection 2504 may be used to provide power to sensors 2410 or environmental feedback components 2412 such as those described with respect to FIG. 24 that are implemented within the wall panel 502. The interface 2502 may further include a communications interface 2508 that allows for wired connection to a standard communications interface such as an RJ-45 connector such that electronic opponents within panel network 2506 of the wall panel 502 may be addressed from an external controller through the communications interface. In addition to, or alternatively a wireless interface 2510 may be utilized to provide communications between the panel network 2506 and an external system controller. The wireless interface 2510 may implement any wireless communications protocol such as Wi-Fi.

Figure 26:
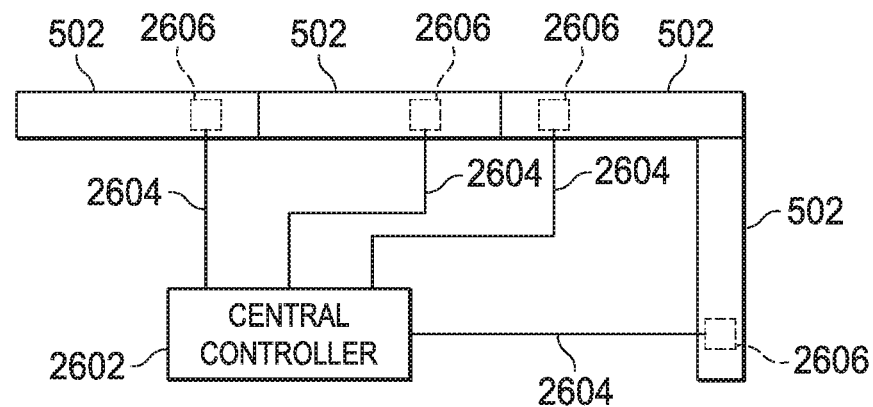
FIG. 26 illustrates a wall panel having communications links with other components.

Referring now also to FIG. 26, there is illustrated the manner in which a central controller 2602 may have individual communication links 2604 with wall panels 502. Each of the wall panels 502 would include one or more Internet accessible components 2606. These Internet accessible components 2606 could comprise individual devices such as sensors or environmental feedback devices such as those described earlier or some type of central control device associated with the panel network 2506 implemented on a particular panel 502. This would provide an Internet of things (IOT) type of communication between the central controller 2602 and the Internet accessible devices 2606. The communication links 2604 may comprise either wired or wireless communication links between the central controller 2602 and the Internet capable devices 2606. This configuration enables the central controller 26 a two communicate with particular Internet accessible components 2606 within the configurable VR model responsive to positioning of a user within the system. Thus, if a user was determined to be close to a Internet accessible device 2606 comprising a fan, the central controller 2606 could turn on the fan to blow a breeze on to the user as they were shown walking past a window or doorway within the VR world. This would allow control of various tactile feedback components within the configurable VR environment based upon the determined user positioning that did not necessarily rely upon sensors as described with respect to FIG. 24. Each of the Internet accessible components 2606 would be independently addressable items that may be individually and specifically contacted by the central controller 2602.

Figure 27:
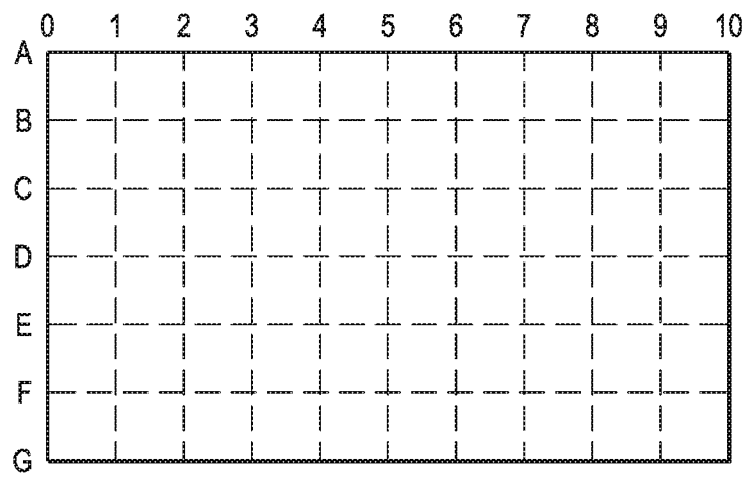
FIG. 27 illustrates a flooring portion with an associated registration grid.

Referring now also to FIG. 27, there is illustrated a flooring portion 2702 of a configurable VR environment model that has been constructed for a particular VR world. The flooring portion 2702 is divided in to a grid consisting of predetermined size squares that provide a map of the floor portion 2702. Each line of the grid is associated with identifiers A through G along one axis and identifiers 0 through 10 on a second perpendicular axis. The identifiers may comprise any component as long as they uniquely identify a physical location within the floor portion 2702. The grid may be based upon particular locations within the cargo tracks 422. In this manner, when a wall panel 520 is placed upon the floor portion 2702 the corners of the base members of the wall panels may be registered according to a grid location that the wall panel corner is most closely located. In this manner, each wall panel 502 within the configurable VR environment model may have a registered physical location associated there with, and a addressable network location associated there with that may be accessed via the central controller 2602. This provides a unique and specific mapping between the physical components of the configurable VR environment model in the visual elements provided in the virtual-reality world.

Utilizing the described system, a configurable physical VR environment model may be quickly assembled by an individual providing a VR environment to a user for gaming or training purposes. Due to the configurable nature of the VR environment model, the game or training process can be changed to reflect new parameters and not be limited to one implementation. This provides a great deal more of flexibility that is much more entertaining within the gaming environment and much more instructive with respect to the training environment.

It will be appreciated by those skilled in the art having the benefit of this disclosure that this system and method for haptic mapping of a configurable virtual reality environment provides a flexible manner for creating a configurable virtual-reality environment that a user may physically interact with while operating within a virtual-reality world. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for providing a configurable virtual reality environment model, comprising:
   a plurality of wall panels having edges that are removeably and directly interconnectable with each other without a need for tools;
   a plurality of floor sections that are removeably interconnectable without a need for tools, the plurality of floor sections including a connection interface for removeably connecting the wall panels to the plurality of floor sections;
   wherein the plurality of wall panels may be configured to place a physical wall in a location that corresponds to a virtual wall located within a virtual reality world such that when a virtual reality display shows a user touching a wall in the virtual reality world the user feels the physical wall placed in the configurable virtual reality environment model;
   wherein the plurality of floor sections further define a grid thereon defined by a plurality of vertical lines and horizontal lines, each of the vertical lines associated with a first group of identifiers and each of the horizontal lines associated with a second group of identifiers, further wherein a wall panel of the plurality of wall panels connected to one of the floor sections may have each corner of the wall panel registered with respect to a closest position of the grid to provide a registered physical location of the wall panel, the registered physical location further having a network address associated therewith enabling Internet access of the wall panel;
   at least one Internet accessible component associated with a portion of the plurality of wall panels for providing tactile feedback to a user responsive to a control signal generated responsive to the user coming within a predetermined distance of a wall panel, wherein each of the at least one network accessible component are addressable via a unique address over the Internet;
   wherein the plurality of wall panels each further comprise an interface for providing interconnection with the Internet, the interface comprising:
      a power connection for providing electrical power to the at least one Internet accessible component;
      a wired connector for providing a wired connection to the Internet for the at least one Internet accessible component using the associated network addressable location using the associated network address;
      a wireless interface for providing a wireless connection to the Internet for the at least one Internet accessible component using the associated network addressable location using the associated network address; and
   a network controller connected to the at least one Internet accessible component through at least one of the wired connector and the wireless interface, the network controller actuating operation of the at least one Internet accessible component by generation of the control signal responsive to the user coming within the predetermined distance of the Internet accessible component and able to access the network addressable locations of the plurality of wall panels by transmitting the control signal to the at least one Internet accessible component associated with the wall panel through the at least one of the wired connector and the wireless interface.

2. The system of claim 1, wherein the at least one network accessible component comprises a sensor for detecting the user within the predetermined distance of the wall panel.

3. The system of claim 2, wherein the sensor comprises at least one of a group consisting of a pressure sensor and a proximity detection sensor.

4. The system of claim 2, wherein the at least one network accessible component further comprises at least one of a group consisting of a fan, a heat lamp, and a spray bottle.

5. A system for providing a configurable virtual reality environment model, comprising:
- a plurality of wall panels having edges that are removeably and directly interconnectable with each other without a need for tools;
- a plurality of floor sections that are removeably interconnectable without a need for tools, the plurality of floor sections including a connection interface for removeably connecting the wall panels to the plurality of floor sections;
- wherein the plurality of wall panels may be configured to place a physical wall in a location that corresponds to a virtual wall located within a virtual reality world such that when a virtual reality display shows a user touching a wall in the virtual reality world the user feels the physical wall placed in the configurable virtual reality environment model;
- at least one network accessible component associated with a portion of the plurality of wall panels for providing tactile feedback to a user responsive to the user coming within a predetermined distance of a wall panel, wherein each of the at least one network accessible component are addressable via a unique address over a network;
- wherein the plurality of wall panels each further comprise an interface for providing interconnection with the Internet, the interface comprising:
  - a power connection for providing electrical power to the at least one network accessible component;
  - a wired connector for providing a wired connection to the Internet for the at least one network accessible component using a network address;
  - a wireless interface for providing a wireless connection to the Internet for the at least one network accessible component using the network address;
- a network controller connected to the at least one network accessible component through at least one of the wired connector and the wireless interface, the network controller actuating operation of the at least one network accessible component responsive to a control signal generated responsive to the user coming within the predetermined distance of the wall panel, wherein each of the at least one network accessible component are addressable via the unique address over the network by the network controller by transmitting the control signal to the at least one network accessible component associated with the wall panel through the at least one of the wired connector and the wireless interface; and
- wherein the plurality of floor sections further define a grid thereon defined by a plurality of vertical lines and horizontal lines, each of the vertical lines associated with a first group of identifiers and each of the horizontal lines associated with a second group of identifiers, further wherein a wall panel of the plurality of wall panels connected to one of the floor sections may have each corner of the wall panel registered with respect to a closest position of the grid to provide a registered physical location of the wall panel, the registered physical location further having the network address associated therewith enabling Internet access of the wall panel that may be communicated with by the network controller.

6. The system of claim 5, wherein the at least one network accessible component comprises a sensor for detecting the user within the predetermined distance of the wall panel.

7. The system of claim 6, wherein the sensor comprises at least one of a group consisting of a pressure sensor and a proximity detection sensor.

8. The system of claim 6, wherein the at least one network accessible component further comprises at least one of a group consisting of a fan, a heat lamp, and a spray bottle.

9. A method for providing a configurable virtual reality environment model, comprising:
- interconnecting edges of a plurality of removeably interconnectable wall panels with each other by a direct connection without a need for tools;
- interconnecting a plurality of floor sections that are removeably interconnectable without a need for tools with each other and with the plurality of wall panels, the plurality of floor sections including a connection interface for removeably connecting the plurality of wall panels to the plurality of floor sections;
- placing each of the plurality of wall panels in a location that corresponds to a virtual wall located within a virtual reality world such that when a virtual reality display shows a user touching a wall in the virtual reality world the user feels a wall panel placed in the configurable virtual reality environment model;
- defining a grid on the plurality of floor sections defined by a plurality of vertical lines and horizontal lines, each of the vertical lines associated with a first group of identifiers and each of the horizontal lines associated with a second group of identifiers;
- registering each corner of a wall panel of the plurality of wall panels connected to the floor sections with respect to a closest position of the grid to provide a registered physical location of the wall panel;
- associating the registered physical location of the wall panel with a network address accessible via a network;
- providing electrical power to at least one network accessible component through a power connection interface in the wall panel;
- providing a wired connection to the at least one network accessible component through a wired connector in the wall panel; and
- providing a wireless connection to the at least one network accessible component through a wireless interface in the wall panel;
- detecting a user coming within a predetermined distance of a wall panel using the at least one network accessible component associated with wall panel and generating a detection signal responsive thereto;
- generating a control signal from a network controller responsive to the detection signal of the user coming within the predetermined distance of the wall panel by the at least one network accessible component received over a network;
- transmitting the control signal from the network controller to the at least one network accessible component via at least one of the wireless connection and the wired connection using the associated network address;
- actuating operation of the at least one network accessible component responsive to the control signal received from the network controller over the at least one of the wireless connection and the wired connection, the at least one network accessible component specifically addressable by the network controller via network address over the at least one of the wireless connection and the wired connection; and providing tactile feedback to the user using the at least one network accessible component responsive to the user coming within the predetermined distance of the wall panel.

10. The method of claim 9, wherein the step of detecting further comprises detecting the user within the predetermined distance of the wall panel through a sensor.

11. The method of claim 10, wherein the sensor comprises at least one of a group consisting of a pressure sensor and a proximity detection sensor.

12. The method of claim 10, wherein the at least one network accessible component further comprises at least one of a group consisting of a fan, a heat lamp, and a spray bottle.

* * * * *